US008838116B2

(12) United States Patent
Yavuz et al.

(10) Patent No.: US 8,838,116 B2
(45) Date of Patent: Sep. 16, 2014

(54) MINIMIZING INTERFERENCE TO NON-ASSOCIATED USERS

(75) Inventors: Mehmet Yavuz, San Diego, CA (US); Yeliz Tokgoz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 12/782,409

(22) Filed: May 18, 2010

(65) Prior Publication Data

US 2010/0298005 A1    Nov. 25, 2010

Related U.S. Application Data

(60) Provisional application No. 61/179,455, filed on May 19, 2009.

(51) Int. Cl.
| H04W 36/00 | (2009.01) |
| H04W 52/24 | (2009.01) |
| H04W 36/20 | (2009.01) |
| H04W 84/04 | (2009.01) |
| H04W 24/02 | (2009.01) |

(52) U.S. Cl.
CPC ......... *H04W 36/20* (2013.01); *H04W 84/045* (2013.01); *H04W 52/244* (2013.01); *H04W 36/0055* (2013.01); *H04W 24/02* (2013.01)
USPC ........ 455/444; 455/423; 455/63.1; 455/67.11

(58) Field of Classification Search
USPC .......... 455/63.1, 67.11, 446, 423, 450, 452.2, 455/444
See application file for complete search history.

(56) References Cited

U.S. PATENT DOCUMENTS

| 7,177,650 | B1 * | 2/2007 | Reiger et al. .................. 455/453 |
| 8,243,682 | B2 | 8/2012 | Nylander et al. |
| 8,625,556 | B2 | 1/2014 | Chen et al. |
| 8,634,360 | B2 | 1/2014 | Liu et al. |
| 8,644,254 | B2 | 2/2014 | Lee et al. |
| 2006/0233138 | A1 | 10/2006 | Park |

(Continued)

FOREIGN PATENT DOCUMENTS

| CN | 1195435 A | 10/1998 |
| CN | 1256058 A | 6/2000 |

(Continued)

OTHER PUBLICATIONS

Huawei: "Self-configuration considerations of Home NodeB" 3GPP Draft; R3-071466 Self-Configuration Considerations of Home Nodeb, 5rd Generation Partnership Project (3GPP), Mobile Competence Centre ; 650, Route Des Lucioles ; F-06921 Sophia-Antipolis Cedex. (3 pages).

(Continued)

*Primary Examiner* — Lewis West

(57) ABSTRACT

A method for reducing interference to wireless communication devices is described. It is determined that a base station is deployed with a first coverage area that overlaps a second coverage area of a femto access point. The base station uses a first carrier for wireless communications. The femto access point uses a second carrier for wireless communications. Transmissions by the femto access point interfere with transmissions by the base station. An amount of radio frequency (RF) leakage experienced by wireless communication devices communicating with the base station is estimated. Interference experienced by the wireless communication devices is minimized.

29 Claims, 20 Drawing Sheets

(56) References Cited

U.S. PATENT DOCUMENTS

| | | |
|---|---|---|
| 2007/0230392 A1 | 10/2007 | Adams et al. |
| 2007/0254620 A1 | 11/2007 | Lindqvist et al. |
| 2007/0258540 A1 | 11/2007 | Ratasuk et al. |
| 2007/0263587 A1 | 11/2007 | Savoor et al. |
| 2008/0069028 A1 | 3/2008 | Richardson |
| 2008/0132239 A1 | 6/2008 | Khetawat et al. |
| 2008/0305801 A1 | 12/2008 | Burgess et al. |
| 2009/0005043 A1 | 1/2009 | Claussen et al. |
| 2009/0042594 A1 | 2/2009 | Yavuz et al. |
| 2009/0047931 A1 | 2/2009 | Nanda et al. |
| 2009/0061873 A1 | 3/2009 | Bao et al. |
| 2009/0082027 A1 | 3/2009 | Yavuz et al. |
| 2009/0097451 A1 | 4/2009 | Gogic |
| 2009/0104912 A1 | 4/2009 | Foster et al. |
| 2009/0131049 A1 | 5/2009 | Osborn |
| 2009/0245195 A1* | 10/2009 | Bhattad et al. ............... 370/329 |
| 2010/0153816 A1 | 6/2010 | Li et al. |
| 2010/0167728 A1 | 7/2010 | Venkitaraman et al. |
| 2010/0173630 A1 | 7/2010 | Han et al. |
| 2010/0177695 A1 | 7/2010 | Ji et al. |
| 2010/0278141 A1 | 11/2010 | Choi-Grogan et al. |
| 2010/0297997 A1 | 11/2010 | Yavuz et al. |
| 2010/0309782 A1 | 12/2010 | Lee et al. |
| 2011/0051684 A1 | 3/2011 | Li et al. |
| 2011/0194513 A1 | 8/2011 | Kim |
| 2012/0028645 A1 | 2/2012 | Kim et al. |

FOREIGN PATENT DOCUMENTS

| | | |
|---|---|---|
| CN | 1448039 A | 10/2003 |
| CN | 1985532 A | 6/2007 |
| EP | 0744115 B1 | 4/2003 |
| EP | 1452062 B1 | 12/2008 |
| EP | 2009941 | 12/2008 |
| JP | 2007129405 A | 5/2007 |
| WO | WO2004008794 | 1/2004 |
| WO | WO2006010958 A2 | 2/2006 |
| WO | WO-2007143254 A2 | 12/2007 |
| WO | WO2008098898 | 8/2008 |
| WO | WO-2008103084 A1 | 8/2008 |
| WO | 2008147268 A1 | 12/2008 |
| WO | WO-2009026162 A1 | 2/2009 |
| WO | WO2009095779 | 8/2009 |
| WO | WO2010005217 | 1/2010 |

OTHER PUBLICATIONS

Li et al., "Methods and Apparatus to Identify the Accessibility of Femto Base Stations in Communication Systems", Dec. 16, 2008, pp. 1-14.
Chowdhury et al., "Handover between Macrocell and Femtocell for UMTS based Networks", Published in ICACT, 2009 dated Feb. 15-18, 2009, pp. 237-241.
Taiwan Search Report—TW099115992—TIPO—Apr. 26, 2013.
Huawei: "Self-configuration considerations of Home NodeB" 3GPP Draft; R3-071466 Self-Configuration Considerations of Home Nodeb, SRD Generation Partnership Project (3GPP), Mobile Competence Centre; 650, Route des Lucioles ; F-06921 Sophia-Antipolis Cedex. (3 pages) Aug. 2007.
International Search Report and Written Opinion—PCT/US2010/035470, International Search Authority—European Patent Office—Sep. 13, 2010.
Yavuz et al: "Interference Management and Performance Analysis of UMTS/HSPA+ Femtocells" IEEE Communications Magazine, Sep. 2009, pp. 102-109, XP002598056 the whole document.
European Search Report—EP14156780—Search Authority—Munich—Apr. 3, 2014.

* cited by examiner

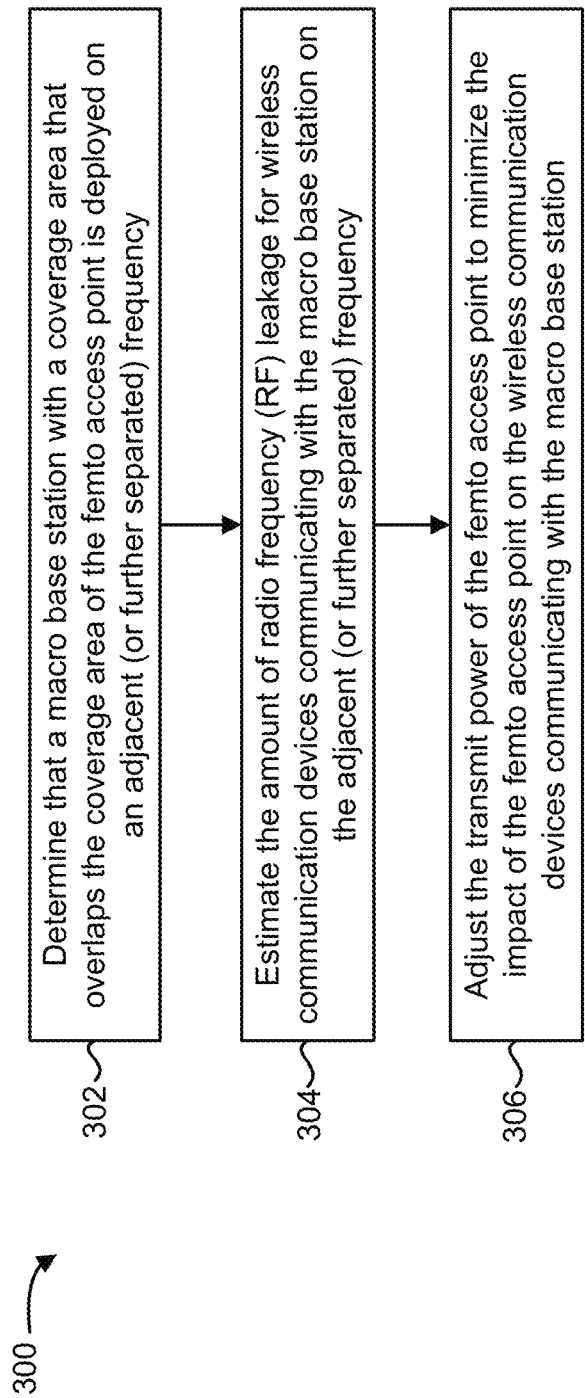

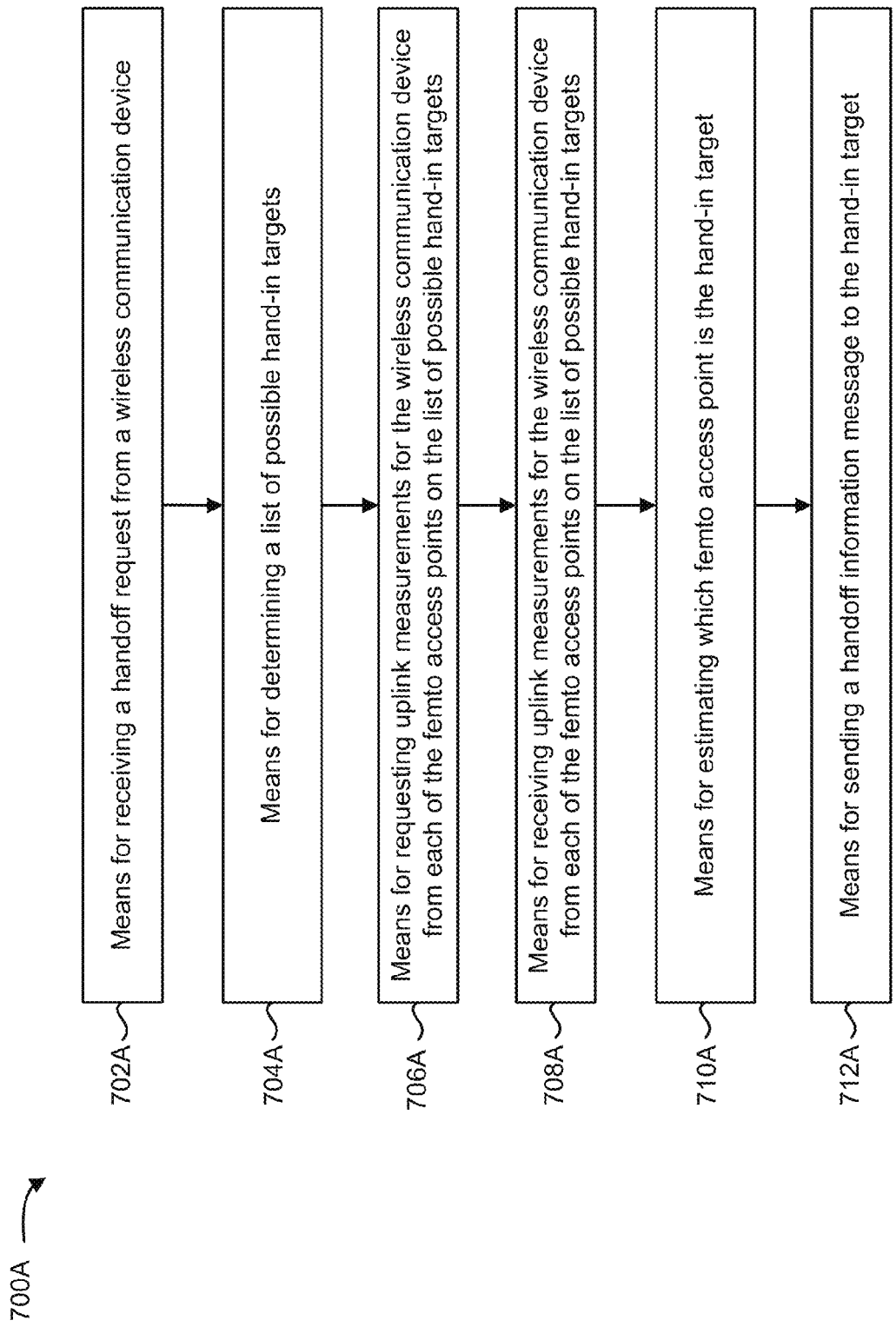

MINIMIZING INTERFERENCE TO NON-ASSOCIATED USERS

RELATED APPLICATIONS

This application is related to and claims priority from U.S. Provisional Patent Application Ser. No. 61/179,455, filed May 19, 2009, for "Femtocell Carrier and Power Adjustment to Minimize Interference to Non-Associated Users."

TECHNICAL FIELD

The present disclosure relates generally to wireless communication systems. More specifically, the present disclosure relates to systems and methods for minimizing interference to non-associated users.

BACKGROUND

Wireless communication systems have become an important means by which many people worldwide have come to communicate. A wireless communication system may provide communication for a number of mobile stations, each of which may be serviced by a base station.

It may be beneficial to use localized base stations that provide service to a select group of mobile stations. These localized base stations may use less power and have smaller coverage areas than normal base stations. The localized base stations may then provide a mobile station with active voice/data access. As localized base stations continue to improve, more localized base stations will become prevalent.

Examples of localized base stations include femtocells and picocells. Localized base stations may be referred to as femto access points without loss of generality. These localized base stations may be controlled by a user. For example, a localized base station may be purchased by an end user and placed in their home or office to increase wireless coverage. A localized base station may also be controlled by a service provider. For example, a service provider may place a localized base station in a public area with high traffic.

As a mobile station approaches a localized base station, the mobile station may detect the localized base station and attempt to access it by sending a registration request. The localized base station may then determine whether to allow access to this mobile station for different services such as a voice/data connection with the mobile station. Mobile stations that are near these localized base stations but not part of the select group may receive strong interference from the localized base stations. This strong interference, in some instances, may prevent a mobile station from obtaining access to a normal base station. As such, benefits may be realized by minimizing the interference of localized base stations on mobile stations.

SUMMARY

A method for reducing interference to wireless communication devices, is described. It is determined that a base station is deployed with a first coverage area that overlaps a second coverage area of a femto access point. The base station uses a first carrier for wireless communications and the femto access point uses a second carrier for wireless communications. Transmissions by the femto access point interfere with transmissions by the base station. An amount of radio frequency (RF) leakage experienced by wireless communication devices communicating with the base station is estimated. Interference experienced by the wireless communication devices is minimized.

The method may be performed by the femto access point or by a core network apparatus. The base station may be a femto access point or a macro base station. Determining that a base station is deployed may include monitoring a downlink signal strength on the first carrier. Minimizing the interference experienced by the wireless communication devices may include adjusting a transmit power of the femto access point. A third carrier may be determined. Minimizing the interference experienced by the wireless communication devices may include switching the femto access point to communicating using the third carrier. The third carrier may have fewer base station and femto access point deployments than the second carrier or the third carrier may have no base station or femto access point deployments. The first carrier and the second carrier may be the same carrier. The first carrier and the second carrier may also be adjacent.

The method may be performed by a core network. Adjusting a transmit power of the femto access point may include sending an adjusted transmit power to the femto access point. Switching the femto access point to communicating using the third carrier may include sending the third carrier to the femto access point. Estimating the amount of RF leakage may be performed using a current transmit power of the femto access point, the second carrier used by the femto access point, the first carrier used by the base station and an adjacent channel interference ratio (ACIR). Adjusting a transmit power of the femto access point may take into account a proximity of the femto access point to the base station.

A wireless device configured for reducing interference to wireless communication devices is also described. The wireless device includes a processor, memory in electronic communication with the processor and instructions stored in the memory. The instructions are executable by the processor to determine that a base station is deployed with a first coverage area that overlaps a second coverage area of a femto access point. The base station uses a first carrier for wireless communications and the femto access point uses a second carrier for wireless communications. Transmissions by the femto access point interfere with transmissions by the base station. The instructions are also executable to estimate an amount of radio frequency (RF) leakage experienced by wireless communication devices communicating with the base station. The instructions are further executable to minimize interference experienced by the wireless communication devices.

A wireless device configured for reducing interference to wireless communication devices is described. The wireless device includes means for determining that a base station is deployed with a first coverage area that overlaps a second coverage area of a femto access point. The base station uses a first carrier for wireless communications and the femto access point uses a second carrier for wireless communications. Transmissions by the femto access point interfere with transmissions by the base station. The wireless device also includes means for estimating an amount of radio frequency (RF) leakage experienced by wireless communication devices communicating with the base station. The wireless device further includes means for minimizing interference experienced by the wireless communication devices.

A computer-program product for reducing interference to wireless communication devices is also described. The computer-program product includes a computer-readable medium having instructions thereon. The instructions include code for determining that a base station is deployed with a first coverage area that overlaps a second coverage area of a femto access point. The base station uses a first carrier for wireless communications and the femto access point uses a second carrier for wireless communications. Transmissions by the femto access point interfere with transmissions by the base station. The instructions also include code for estimating an amount of radio frequency (RF) leakage experienced by wireless communication devices communicating with the base station. The instructions further include code for minimizing interference experienced by the wireless communication devices.

BRIEF DESCRIPTION OF THE DRAWINGS

FIG. 3 is a flow diagram of a method for minimizing the interference to wireless communication devices near a femto access point;

FIG. 8A illustrates means-plus-function blocks corresponding to the method of FIG. 8;

DETAILED DESCRIPTION

Figure 1:
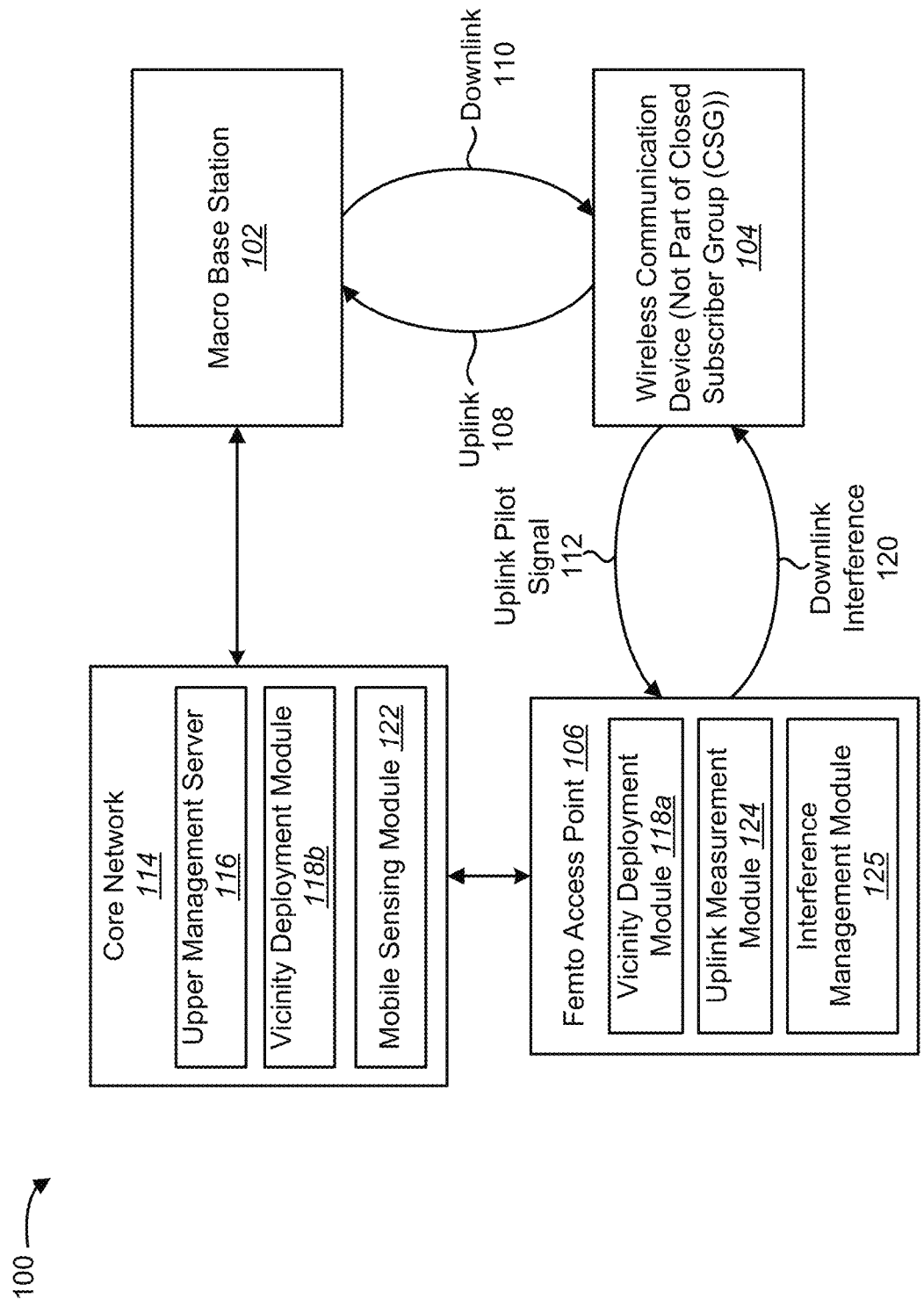
FIG. 1 shows a wireless communication system with multiple wireless devices.

FIG. 1 shows a wireless communication system 100 with multiple wireless devices. Wireless communication systems 100 are widely deployed to provide various types of communication content such as voice, data, and so on. These systems may be multiple-access systems capable of supporting communication with multiple users by sharing the available system resources (e.g., bandwidth and transmit power). A wireless device may be a base station 102, a wireless communication device 104 or a femto access point 106. A core network 114 is also illustrated in FIG. 1.

The core network 114 is the central part of a telecommunications network that provides various services to customers that are connected to the core network 114. The core network 114 may be a single entity or multiple entities that facilitate wireless communication between multiple wireless communication devices 104. The core network 114 may include multiple processors in one or more locations. The core network 114 may be an apparatus or group of apparatuses. One of the main functions of the core network 114 is to route calls across the public switched telephone network (PTSN). The core network 114 may provide a path for the exchange of information between different sub-networks. The core network 114 may include switches and routers.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

A base station 102 may be referred to as an evolved NodeB (eNB). A semi-autonomous base station may be referred to as a home evolved NodeB (HeNB). An HeNB may thus be one example of an eNB. The HeNB and/or the coverage area of an HeNB may be referred to as a femtocell, a picocell, an HeNB cell, a femto access point 106 or a closed subscriber group (CSG) cell. Femto access point 106 is used herein. Femto access points 106 are low-power base stations that extend the range of conventional wide area network base stations. Femto access points 106 provide voice and high-speed data service inside homes and offices for wireless communication devices 104 supporting cellular radio communication techniques.

Access to a femto access point 106 depends on the kind of access control that the femto access point 106 uses. With open access, any wireless communication device 104 can access and receive service from a femto access point 106. With closed subscriber group (CSG) or restricted access, only members of the CSG are allowed to access and receive service from a femto access point 106. A wireless communication device 104 that is not part of the closed subscriber group (CSG) is thus not able to be associated with the femto access point 106.

Communications in a wireless communication system 100 (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems or other multiple access techniques.

A wireless communication system employing the teachings herein may be designed to implement one or more standards, such as IS-95, cdma2000, IS-856, W-CDMA, time division synchronous code division multiple access (TD-SCDMA) and other standards. A CDMA network may implement a radio technology such as Universal Terrestrial Radio Access (UTRA), cdma2000 or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). The teachings herein may be implemented in a Third Generation Partnership Project (3GPP) Long Term Evolution (LTE) system, an Ultra-Mobile Broadband (UMB) system and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (IxRTT, 1xEV-DO RelO, RevA, RevB) technology and other technologies. For clarity, certain aspects of the techniques are described below for cdma2000, and cdma2000 terminology is used in much of the description below.

Low power base stations such as home evolved NodeBs (HeNB), picocells and femtocells are used in addition to the normal base stations (a normal base station is referred to herein as a macro base station 102). A picocell may refer to a base station controlled by the network operator that operates on a much smaller scale than a macro base station 102. A femtocell may refer to a base station controlled by a consumer that operates on a much smaller scale than a macro base station 102. A femtocell may provide service to a closed subscriber group (CSG). These low power base stations are referred to herein as femto access points 106. A femto access point 106 may communicate with the core network 114 via a DSL router (not shown) or a cable modem (not shown).

The macro base station 102 may communicate with one or more wireless communication devices 104. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc. A wireless communication device 104 may communicate with zero, one or multiple base stations 102 on the downlink 110 and/or uplink 108 at any given moment. The downlink 110 (or forward link) refers to the communication link from a base station (such as a macro base station 102 or a femto access point 106) to a wireless communication device 104 and the uplink 108 (or reverse link) refers to the communication link from a wireless communication device 104 to a base station.

A wireless communication device 104 may be part of a closed subscriber group (CSG). A femto access point 106 may restrict access to the femto access point 106 to wireless communication devices 104 that are part of the closed subscriber group (CSG). The wireless communication device 104 of FIG. 1 may not be part of the closed subscriber group (CSG) corresponding to the femto access point 106. The wireless communication device 104 may instead communicate with a macro base station 102 via an uplink 108 and downlink 110. However, the wireless communication device 104 may be located within the coverage region of the femto access point 106. Thus, the femto access point 106 may receive uplink pilot signals 112 from the wireless communication device 104.

Due to the unplanned deployment of femto access points 106, a femto access point 106 can cause downlink interference 120 to a wireless communication device 104 communicating with a macro base station 102 or other femto access point when the coverage area of the femto access point 106 overlaps the coverage area of the macro base station 102 or other femto access point. For example, a femto access point 106 installed near a window of a residence can cause significant downlink interference 120 to a wireless communication device 104 serviced by a macro base station 102. Similarly, in a multiple resident apartment building, a femto access point 106 installed near a wall separating two residences can cause significant interference to wireless communication devices 104 operated by the neighbors.

Although this problem is most severe in co-channel (i.e., single carrier) femto access point 106 and macro base station 102 deployments, it can still pose a problem when the femto access point 106 and the nearby wireless communication device 104 are on different carriers (either adjacent or further separated) due to radio frequency (RF) leakage from the femto access point 106. In one configuration the femto access point 106 and the nearby wireless communication device 104 may use the same carrier. To reduce/minimize the downlink interference 120, the femto access point 106 may reduce the downlink transmit power or switch to a different carrier.

The femto access point 106 may include a vicinity deployment module 118*a*. The vicinity deployment module 118*a* may estimate the amount of RF leakage (i.e., downlink interference 120) the femto access point 106 creates for nearby wireless communication devices 104. The vicinity deployment module 118*a* may then adjust the transmit power of the femto access point 106. Alternatively, the vicinity deployment module 118*a* may switch the femto access point 106 to a different carrier. When there are no nearby wireless communication devices 104, the femto access point 106 may increase the transmit power.

In one configuration, the core network 114 may include a vicinity deployment module 118*b*. The vicinity deployment module 118*b* on the core network 114 may perform a similar function as the vicinity deployment module 118*a* on the femto access point 106 except that the vicinity deployment module 118*b* on the core network 114 may receive network information from the femto access point 106, make decisions for the femto access point 106 and send instructions to the femto access point 106. Vicinity deployment modules 118 are discussed in further detail below in relation to FIG. 2.

The core network 114 may also include a mobile sensing module 122. The mobile sensing module 122 may sense requests for active user hand-in support by wireless communication devices 104. In other words, the mobile sensing module 122 may detect requests by a wireless communication device 104 to attempt a hand-off from the macro base station 102 to the femto access point 106. The mobile sensing module 122 may then instruct the femto access point 106 to adjust transmit power and/or switch to a different carrier to reduce the interference experienced by the wireless communication device 104.

The femto access point 106 may include an uplink measurement module 124. The uplink measurement module 124 may measure the signal strength of received uplink pilot signals 112 from a wireless communication device 104 that has requested a hand-off to a hand-in target such as the femto access point 106. Hand-in targets are discussed in further detail below in relation to FIG. 5.

The femto access point 106 may also include an interference management module 125. The interference management module 125 may adjust the transmit power of the femto access point 106 and/or switch the femto access point 106 to a different carrier when instructions from the core network 114 indicate so or when the femto access point 106 has autonomously decided to do so. The interference management module 125 may limit the coverage holes created by the femto access point 106 for wireless communication devices 104 that are not part of the closed subscriber group (CSG) associated with the femto access point 106.

In one configuration, the interference management module 125 may receive instructions from the core network 114 on when to adjust the transmit power. The interference management module 125 may then determine the transmit power adjustments to be made. In another configuration, the interference management module 125 may receive instructions from the core network 114 that indicate what transmit power adjustments should be made. The interference management module 125 may also receive instructions from the core network 114 about when to switch to another carrier. The interference management module 125 may then determine which carrier to switch to. In one configuration, the instructions from the core network 114 may indicate which carrier the femto access point 106 is to switch to.

In one configuration, the core network 114 may include an upper management server 116. The upper management server 116 may allow the core network 114 to manage one or more femto access points 106. For example, the upper management server 116 may allow the vicinity deployment module 118b on the core network 114 to control the transmit power and/or carrier selection of the femto access point 106. The upper management server 116 may be a femto convergence server (FCS).

Figure 2:
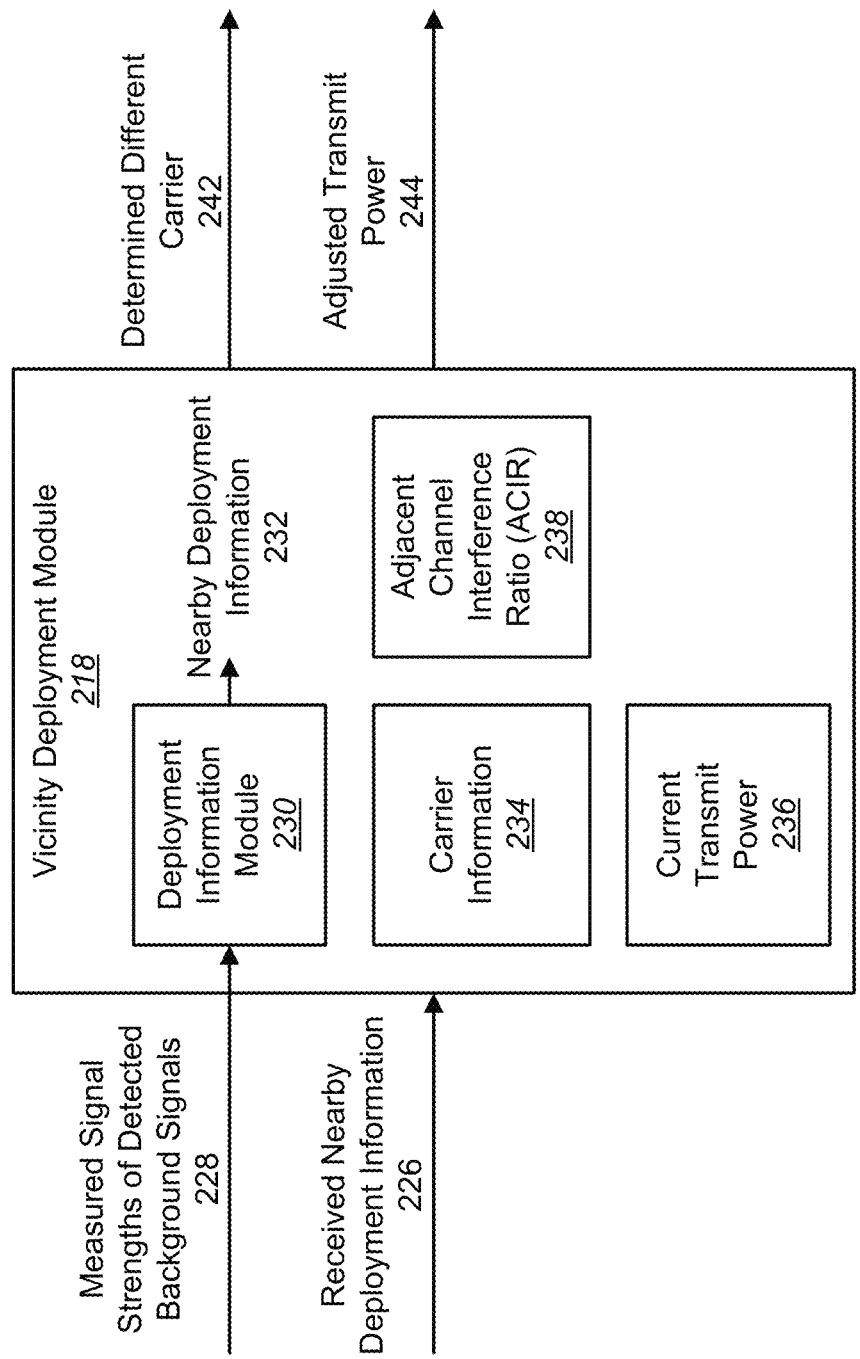
FIG. 2 is a block diagram of a vicinity deployment module.

FIG. 2 is a block diagram of a vicinity deployment module 218. The vicinity deployment module 218 of FIG. 2 may be one configuration of either the vicinity deployment module 118a on the femto access point 106 or the vicinity deployment module 118b on the core network 114. The vicinity deployment module 218 may receive nearby deployment information 226. Received nearby deployment information 226 may indicate that a macro base station 102 (or other femto access point) is deployed with a coverage area that overlaps the coverage area of the femto access point 106. Received nearby deployment information 226 may be received from a femto access point 106 (if the vicinity deployment module 218 is on a core network 114), received from a core network 114 or received from a macro base station 102 (via the core network 114 if the vicinity deployment module 218 is on a femto access point 106).

The received nearby deployment information 226 may indicate that a wireless communication device 104 not part of the closed subscriber group (CSG) associated with the femto access point 106 is nearby the femto access point 106 and is trying to handoff to the femto access point 106. In one configuration, the received nearby deployment information 226 may indicate that the wireless communication device 104 is close enough to the femto access point 106 that interference management is necessary.

The vicinity deployment module 218 may receive measured signal strengths 228 of detected background signals. For example, if the vicinity deployment module 218 is on a femto access point 106, the femto access point 106 may measure the signal strength of downlink signals 110 (such as a background signal on an adjacent or further separated frequency from the downlink signals used by the femto access point 106) sent by the macro base station 102. The femto access point 106 may then provide the measured signal strengths 228 to the vicinity deployment module 218. As another example, if the vicinity deployment module 218 is on the core network 114, the measured signal strengths 228 of downlink signals 110 received by the femto access point 106 from the macro base station 102 may be forwarded to the core network 114 and provided to the vicinity deployment module 218 on the core network 114.

The vicinity deployment module 218 may include a deployment information module 230. The deployment information module 230 may obtain nearby deployment information 232 from the measured signal strengths 228 of detected background signals. Similar to received nearby deployment information 226, the obtained nearby deployment information 232 may indicate that a macro base station 102 (or other femto access point) is deployed with a coverage area overlapping the coverage area of the femto access point 106. Both the received nearby deployment information 226 and the derived nearby deployment information 232 may include information about the current carrier of the macro base station 102 (or other femto access point).

The vicinity deployment module 218 may also include carrier information 234. The carrier information 234 may include the current carrier of the femto access point 106. The carrier information 234 may also include potential carriers that the femto access point 106 may switch to if necessary. In one configuration, the carrier information 234 may include the channel deployments of adjacent (or further separated) carriers. For example, the carrier information 234 may indicate which carriers near the current carrier are used by nearby wireless communication devices 104 with the potential for interference.

The vicinity deployment module 218 may include the current transmit power 236 of the femto access point 106. The vicinity deployment module 218 may also include an adjacent channel interference ratio (ACIR) 238. The adjacent channel interference ratio (ACIR) 238 is the ratio of the power on the desired channel to the interference power created for the adjacent channels. The adjacent channel interference ratio (ACIR) 238 may thus represent the amount of interference that will be caused to adjacent channels by the current transmit power 236 of the femto access point 106. The adjacent channel interference ratio (ACIR) 238 is a function of the transmitter and receiver design of the femto access point 106 and the wireless communication device 104. The adjacent channel interference ratio (ACIR) 238 may be known to or estimated by the vicinity deployment module 218.

In one configuration, the vicinity deployment module 218 may determine that the femto access point 106 should switch to a different carrier. The vicinity deployment module 218 may then output the determined different carrier 242 (i.e., an indication of which carrier to switch to). In another configuration, the vicinity deployment module 218 may determine that the femto access point 106 should adjust the transmit power. The vicinity deployment module 218 may then output the adjusted transmit power 244 to be used by the femto access point 106. If the vicinity deployment module 218 is on the core network 114, the determined different carrier 242 and/or adjusted transmit power 244 may be sent to the femto access point 106.

FIG. 3 is a flow diagram of a method 300 for minimizing the interference to wireless communication devices 104 near a femto access point 106. The method 300 may be performed by a vicinity deployment module 218. The vicinity deployment module 218 may be located on a femto access point 106 or on the core network 114. The vicinity deployment module 218 may determine 302 that a macro base station 102 (or other femto access point) is deployed on an adjacent (or further separated) frequency with a coverage area that overlaps the coverage area of the femto access point 106. In other words, the vicinity deployment module 218 may determine that a macro base station 102 (or other femto access point) with a coverage area overlapping the coverage area of the femto access point 106 is using a carrier that is close to the carrier used by the femto access point 106. A carrier that is close/adjacent to another carrier does not have to be immediately adjacent to the other carrier. Instead, a carrier that is close/adjacent to another carrier may be multiple carriers away in either direction (i.e., above or below the frequency of the carrier).

The vicinity deployment module 218 may estimate 304 the amount of radio frequency (RF) leakage for wireless communication devices 104 communicating with the macro base station 102 (or other femto access point) on the adjacent (or further separated) frequency. The amount of radio frequency (RF) leakage may depend on the current transmit power 236 of the femto access point 106, the current carrier of the femto access point 106, the carrier used by the macro base station 102 (or other femto access point) and the adjacent channel interference ratio (ACIR) 238. For example, an interference threshold limiting the amount of interference created on nearby wireless communication devices 104 due to the femto access point 106 may be imposed. If the femto access point 106 can reduce transmit power and maintain a certain coverage area (i.e., cover as much area as a coverage threshold), then power reduction can be accomplished. If not, then the femto access point 106 may switch to a different carrier 242.

If power reduction can be accomplished, the vicinity deployment module 218 may adjust 306 the transmit power of the femto access point 106 to minimize the impact of the femto access point 106 on the wireless communication devices 104 communicating with the macro base station 102 (or other femto access point). Adjusting 306 the transmit power of the femto access point 106 may include sending an adjusted transmit power to the femto access point 106 if the vicinity deployment module 218 is located on the core network 114. The adjusted transmit power may take into account the proximity of the femto access point 106 to the macro base station 102 or other femto access point.

Figure 3A:
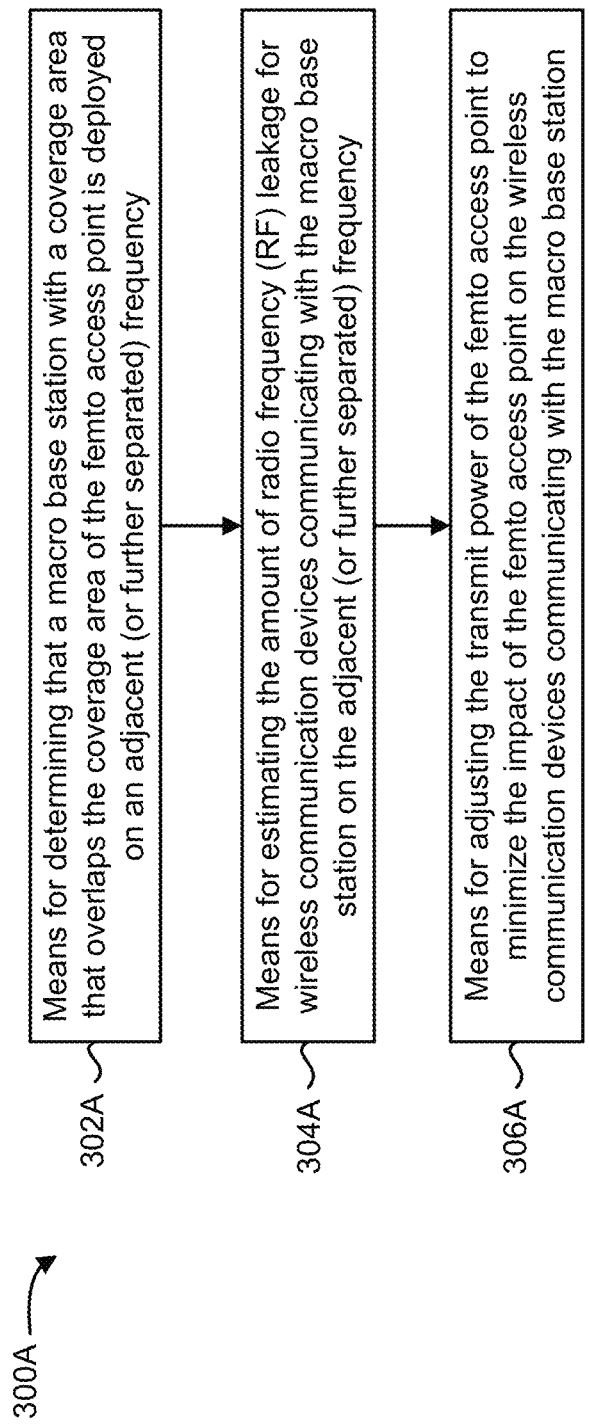
FIG. 3A illustrates means-plus-function blocks corresponding to the method of FIG. 3.

The method 300 of FIG. 3 described above may be performed by various hardware and/or software component(s) and/or module(s) corresponding to the means-plus-function blocks 300A illustrated in FIG. 3A. In other words, blocks 302 through 306 illustrated in FIG. 3 correspond to means-plus-function blocks 302A through 306A illustrated in FIG. 3A.

Figure 4:
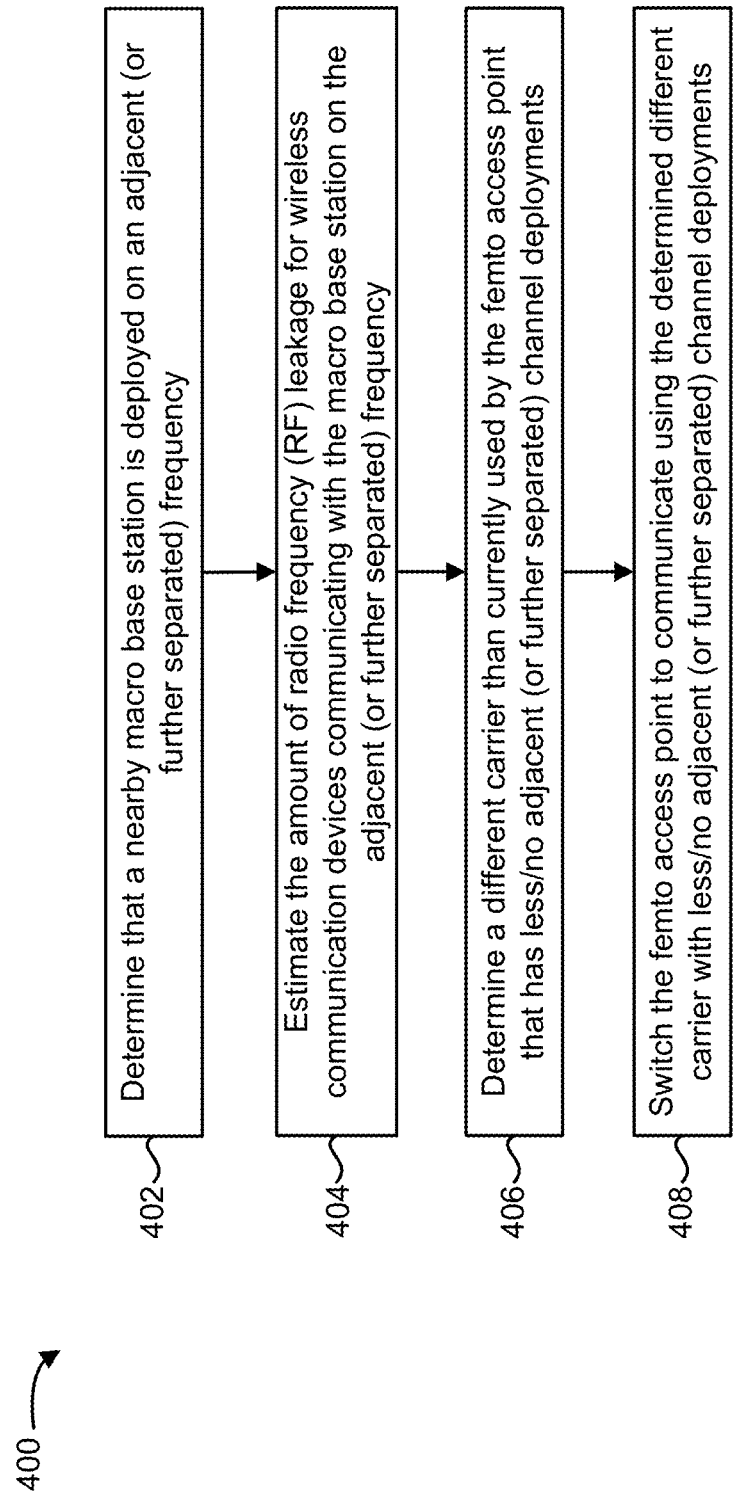
FIG. 4 is a flow diagram of another method for minimizing the interference to wireless communication devices near a femto access point.

FIG. 4 is a flow diagram of another method 400 for minimizing the interference to wireless communication devices 104 near a femto access point 106. The method 400 may be performed by a vicinity deployment module 218. The vicinity deployment module 218 may be located on the femto access point 106 or on the core network 114. The vicinity deployment module 218 may determine 402 that a macro base station 102 (or other femto access point) with a coverage area overlapping the coverage area of the femto access point 106 is deployed on an adjacent (or further separated) frequency.

The vicinity deployment module 218 may estimate 404 the amount of radio frequency (RF) leakage for wireless communication devices 104 communicating with the macro base station 102 (or other femto access point) on the adjacent (or further separated) frequency. The amount of radio frequency (RF) leakage may depend on the current transmit power 236 of the femto access point 106, the current carrier of the femto access point 106, the carrier used by the macro base station 102 (or other femto access point) and the adjacent channel interference ratio (ACIR) 238. The femto access point 106 should know the emissions at a wide range of carriers. Thus, it can take preventative measures if there are any carriers with deployments at risk of being affected by the radio frequency (RF) leakage (i.e., the downlink interference 120).

The vicinity deployment module 218 may determine 406 a different carrier 242 than currently used by the femto access point 106 that has less/no adjacent (or further separated) channel deployments. The vicinity deployment module 218 may switch 408 the femto access point 106 to communicating using the determined different carrier 242 with less/no adjacent (or further separated) channel deployments. Switching 408 the femto access point 106 to the determined different carrier 242 may include sending the determined different carrier 242 to the femto access point 106 if the vicinity deployment module 218 is located on the core network 114.

Figure 4A:
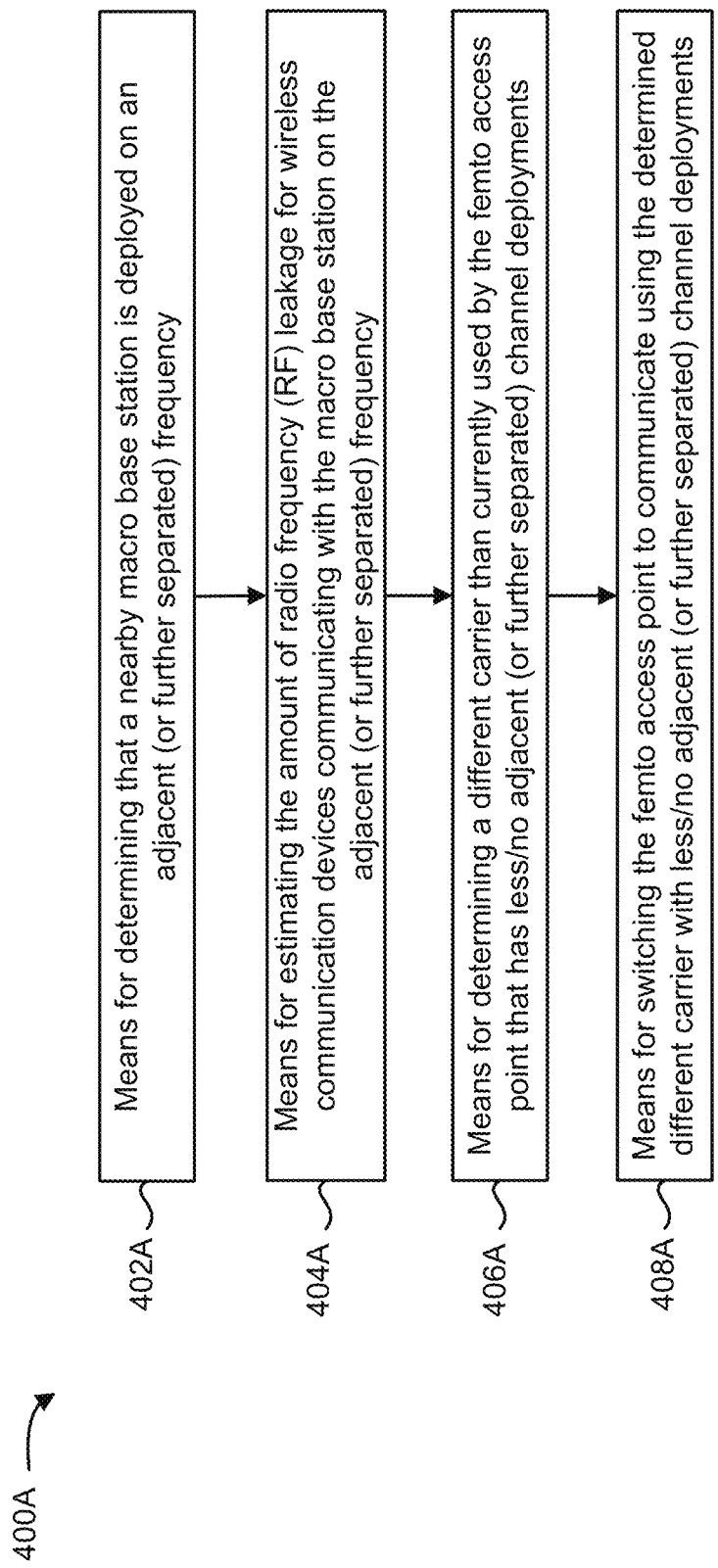
FIG. 4A illustrates means-plus-function blocks corresponding to the method of FIG. 4.

The method 400 of FIG. 4 described above may be performed by various hardware and/or software component(s) and/or module(s) corresponding to the means-plus-function blocks 400A illustrated in FIG. 4A. In other words, blocks 402 through 408 illustrated in FIG. 4 correspond to means-plus-function blocks 402A through 408A illustrated in FIG. 4A.

Figure 5:
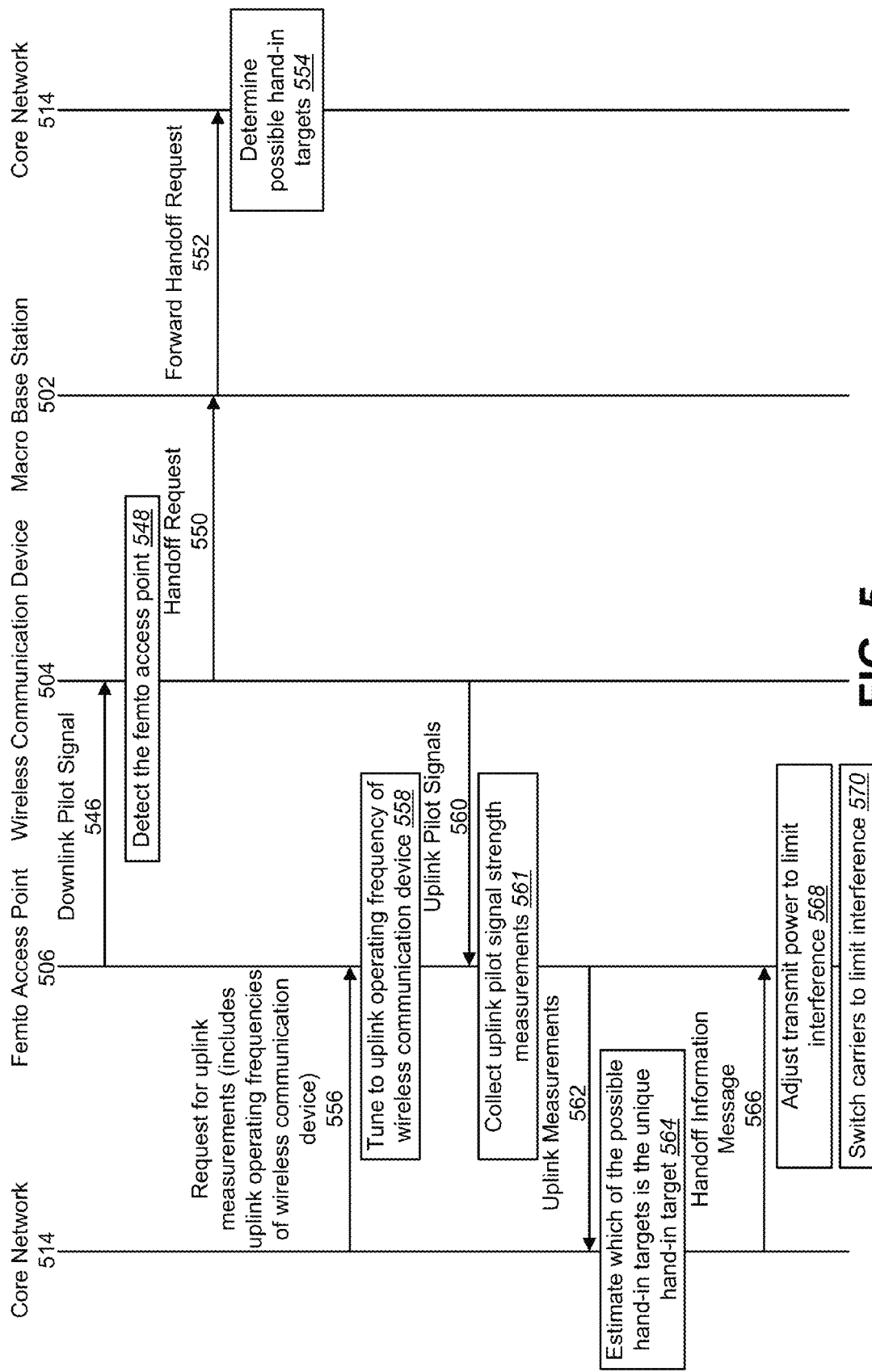
FIG. 5 is a timing diagram illustrating a mobile sensing approach to minimizing interference to wireless communication devices near a femto access point.

FIG. 5 is a timing diagram illustrating a mobile sensing approach to minimizing interference to wireless communication devices 504 near a femto access point 506. A femto access point 506 may broadcast downlink pilot signals 546. The downlink pilot signals 546 may be received by a wireless communication device 504 that is nearby the femto access point 506 but not part of the closed subscriber group (CSG) associated with the femto access point 506. The wireless communication device 504 may be in an active voice call. The wireless communication device 504 may communicate with a macro base station 502. Upon receiving the downlink pilot signals 546, the wireless communication device 504 may detect 548 the femto access point 506.

Upon detecting 548 the femto access point 506, the wireless communication device 504 may determine to handoff from the macro base station 502 to the femto access point 506 during the active call. To maintain the active call, the wireless communication device 504 may need to perform an active hand-in to the femto access point 506. In one configuration, the macro base station 502 may instead be another femto access point. The wireless communication device 504 may send a handoff request 550 to the macro base station 502. The macro base station 502 may forward the handoff request 552 to the core network 514. The core network 514 may be able to control some functions of a femto access point 506.

Information included in the handoff request 552 may not be sufficient to uniquely identify the hand-in target. A hand-in target refers to the requested target in a handoff request 552 (i.e., the femto access point 506). Upon receiving the handoff request 552, the core network 514 may determine 554 a list of possible hand-in targets. The hand-in targets on the list of hand-in targets may be femto access points that share the same pseudonoise (PN) code reported by the wireless communication device 504 in the Pilot Strength Measurement Message (PSMM) in the handoff request 552 along with other supplemental information regarding the vicinity of the wireless communication device 504.

To determine the unique hand-in target, a technique called mobile sensing may be used. In mobile sensing, the core network 514 may send a request 556 for uplink measurements of the wireless communication device 504 (which includes the uplink operating frequency of the wireless communication device 504) to each of the possible hand-in targets. The femto access point 506 may receive the request 556 and tune 558 to the uplink operating frequency of the wireless communication device 504. The femto access point 506 may then receive uplink pilot signals 560 from the wireless communication device 504. The femto access point 506 may collect 561 uplink pilot signal strength measurements (i.e., energy per chip (Ecp)) over a certain time.

The femto access point 506 may send the uplink pilot signal strength measurements 562 to the core network 514. The core network 514 may receive uplink pilot signal strength measurements 562 from multiple femto access points that were on the list of possible hand-in targets. The core network 514 may then estimate 564 which of the possible hand-in targets is the unique hand-in target (in this case, the femto access point 506). Other techniques for determining the hand-in target may also be used, such as additional overhead messages sent by the femto access point 106.

The core network 514 may send a handoff information message 566 to the femto access point 506. Upon receiving the handoff information message 566, the femto access point 506 knows that the wireless communication device 504 is nearby (and that the wireless communication device 504 is not part of the closed subscriber group (CSG) corresponding to the femto access point 506). In one configuration, the femto access point 506 may determine that interference management is necessary based on the outcome of the mobile sensing. For example, the femto access point 506 may determine that interference management is necessary because the mobile sensing indicated that the femto access point 506 was the likely hand-in target.

Because the femto access point 506 knows the amount of radio frequency (RF) emissions created, the femto access point 506 may take preventative measures to create a coverage hole for the wireless communication device 504. For example, the femto access point 506 may adjust 568 transmit power to limit interference. As another example, the femto access point 506 may switch 570 carriers to limit interference.

Figure 6:
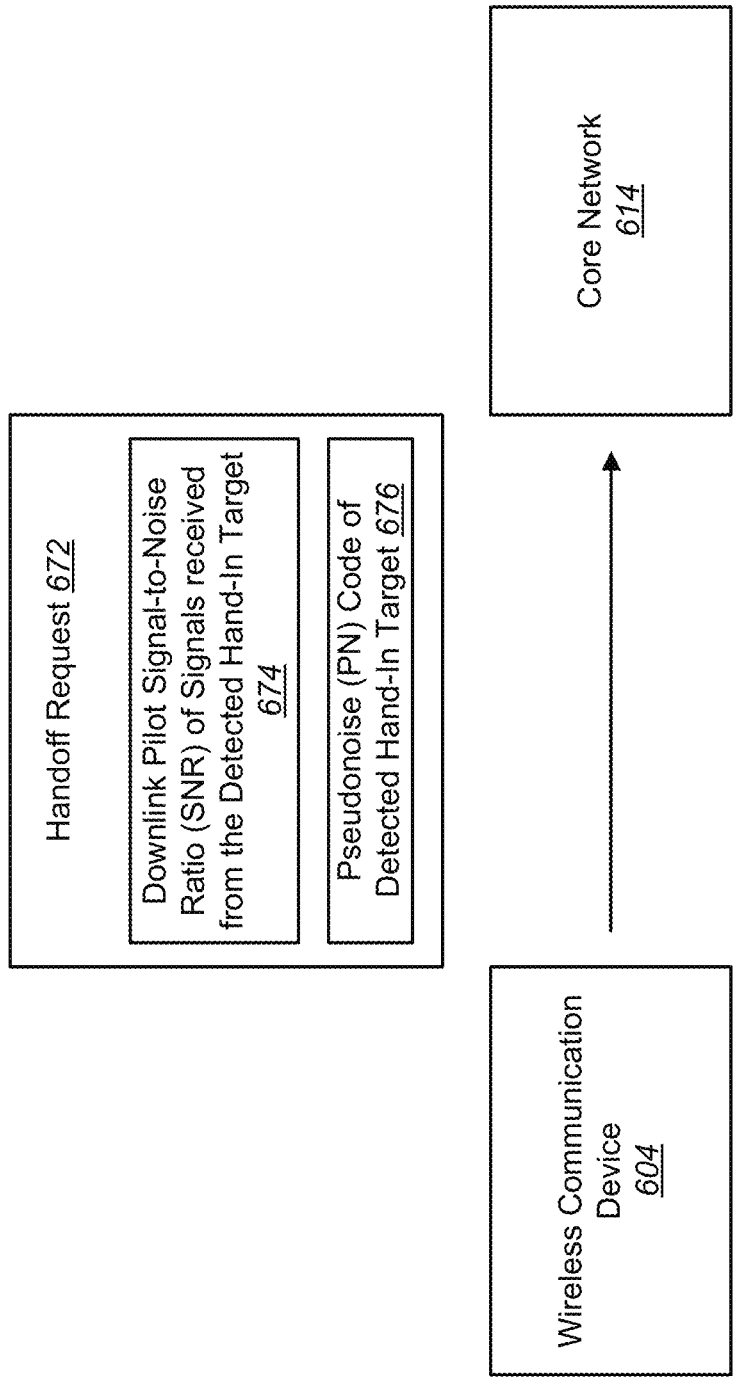
FIG. 6 illustrates the transmission of a handoff request from a wireless communication device to a core network.

FIG. 6 illustrates the transmission of a handoff request 672 from a wireless communication device 604 to a core network 614. The wireless communication device 604 of FIG. 6 may be one configuration of the wireless communication device 104 of FIG. 1. The core network 614 of FIG. 6 may be one configuration of the core network 114 of FIG. 1. The wireless communication device 604 may send a handoff request 672 to the core network 614. Because the wireless communication device 604 cannot communicate directly with the core network 614, the wireless communication device 604 may send the handoff request 672 to the core network 614 via a base station (such as a femto access point or a macro base station 102).

The handoff request 672 may include the downlink pilot signal-to-noise ratio (SNR) 674 of signals received by the wireless communication device 604 from the hand-in target. The handoff request 672 may also include the pseudonoise (PN) code 676 of the detected hand-in target. Due to the high reuse of pseudonoise (PN) codes 676 among different femto access points, the information in the handoff request 672 may not be sufficient for the core network 614 to uniquely identify the hand-in target. Instead, the core network 614 may use mobile sensing to uniquely identify the hand-in target. Mobile sensing was discussed above in relation to FIG. 5 and is discussed in further detail below in relation to FIG. 8.

Figure 7:
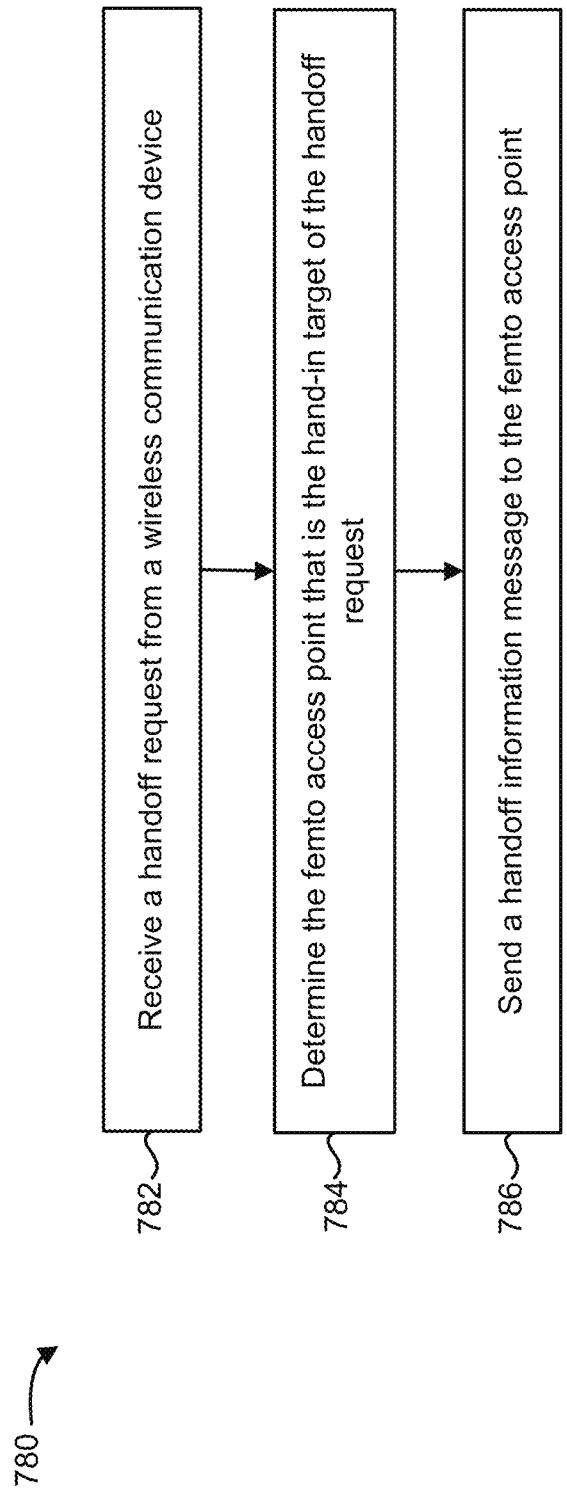
FIG. 7 is a flow diagram of a method for interference management.

FIG. 7 is a flow diagram of a method 780 for interference management. The method 780 may be performed by the core network 114. In one configuration, the method 780 may be performed by an apparatus as part of the core network 114. The core network 114 may receive 782 a handoff request 672 from a wireless communication device 104. Because the wireless communication device 104 cannot communicate directly with the core network 114, the handoff request 672 may be received via a base station (such as a macro base station 102 or a femto access point).

The core network 114 may then determine 784 the femto access point 106 that is the hand-in target of the handoff request 672. Determining that a particular femto access point 106 is the hand-in target may be done in many ways. For example, a mobile sensing approach may be used to determine that a particular femto access point 106 is the hand-in target. Mobile sensing is discussed in further detail below in relation to FIG. 8. As another example, additional information sent by the femto access point 106 may be used to identify the femto access point 106 as the hand-in target. The femto access point 106 may send additional information to the core network 114 in overhead messages that uniquely identify the femto access point 106 as the hand-in target. In this case, when a wireless communication device 104 requests a handoff, the core network 114 knows that the handoff request 672 corresponds to the femto access point 106.

The wireless communication device 104 may not be part of a closed subscriber group (CSG) associated with the femto access point 106. Because the wireless communication device 104 has attempted to handoff to the femto access point 106, the core network 114 may infer that the wireless communication device 104 is nearby the femto access point 106 and that the femto access point 106 should enable interference management.

The core network 114 may send 786 a handoff information message 566 to the femto access point 106. The handoff information message 566 may inform the femto access point 106 of the nearby wireless communication device 104 attempting to handoff to the femto access point 106. In one configuration, the handoff information message 566 may inform the femto access point 106 that it is the hand-in target. The handoff information message 566 may also include interference management instructions for the femto access point 106. For example, the handoff information message 566 may include specific instructions for the femto access point 106 to adjust transmit power or switch to a different carrier. In one configuration, the handoff information message 566 may include a dictated transmit power for the femto access point 106 to use. In another configuration, the handoff information message 566 may include a carrier selected by the network for the femto access point 106 to use.

Figure 7A:
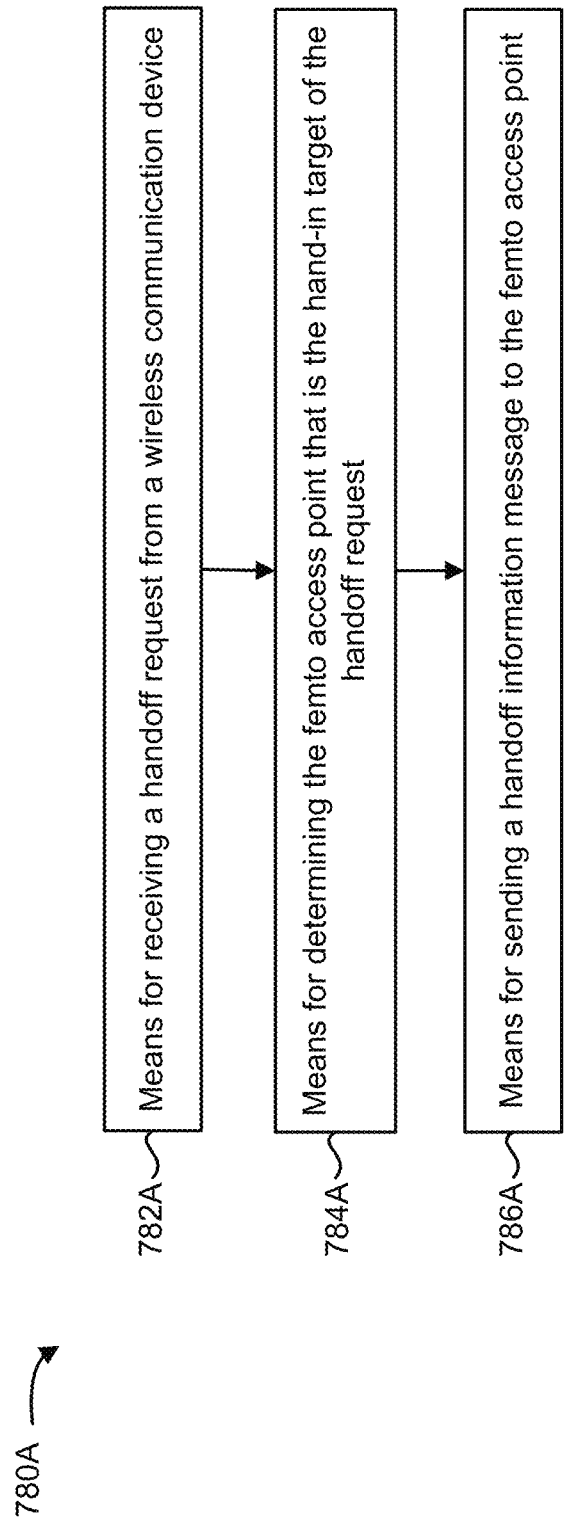
FIG. 7A illustrates means-plus-function blocks corresponding to the method of FIG. 7.

The method 780 of FIG. 7 described above may be performed by various hardware and/or software component(s) and/or module(s) corresponding to the means-plus-function blocks 780A illustrated in FIG. 7A. In other words, blocks 782 through 786 illustrated in FIG. 7 correspond to means-plus-function blocks 782A through 786A illustrated in FIG. 7A.

Figure 8:
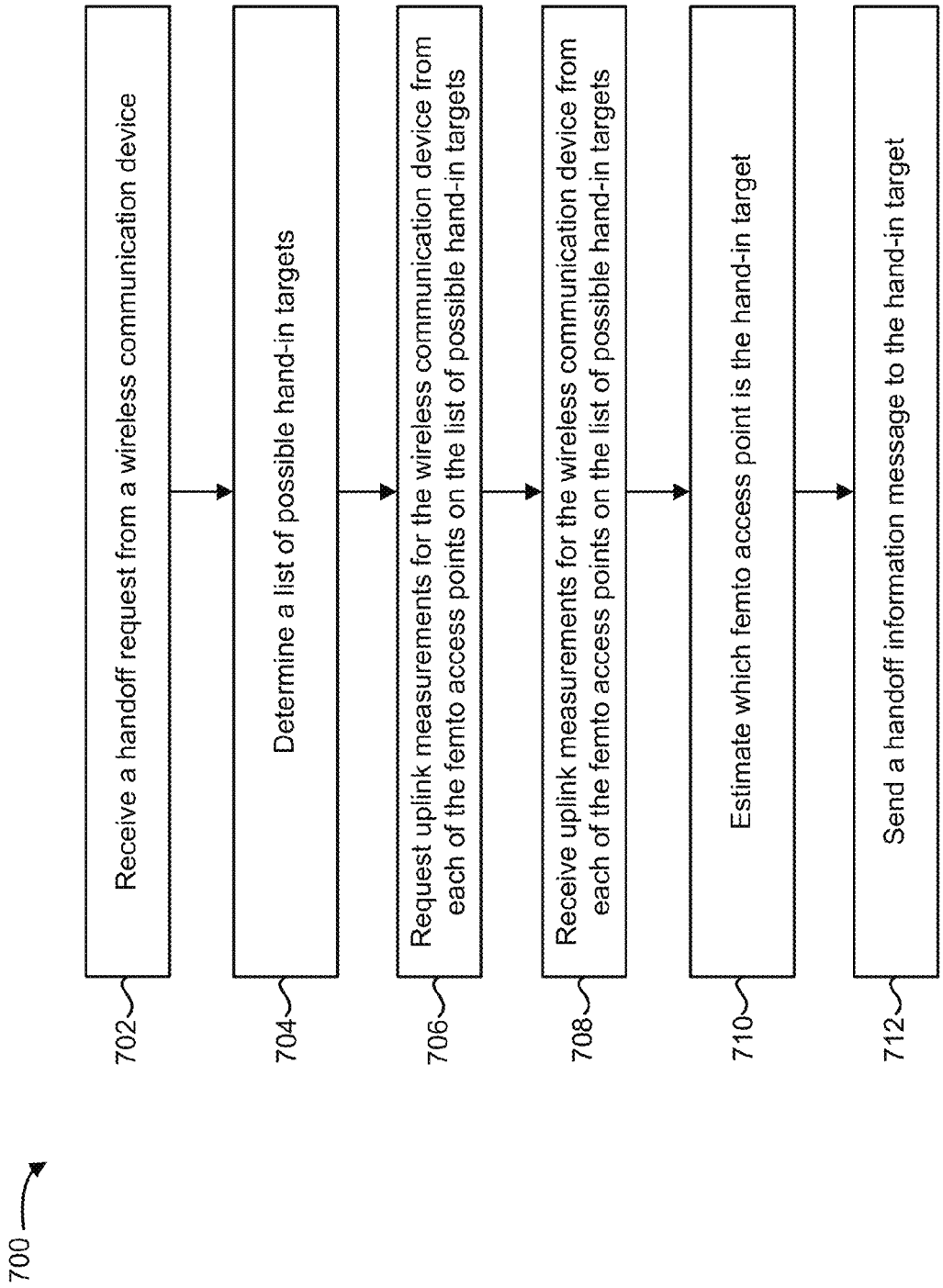
FIG. 8 is a flow diagram of a method for mobile sensing.

FIG. 8 is a flow diagram of a method 700 for mobile sensing. The method 700 may be performed by the core network 114. In one configuration, the method 700 may be performed by an apparatus as part of the core network 114. The core network 114 may receive 702 a handoff request 672 from a wireless communication device 104. Because the wireless communication device 104 cannot communicate directly with the core network 114, the handoff request 672 may be received via a base station (such as a macro base station 102 or a femto access point).

The core network 114 may then determine 704 a list of possible hand-in targets. The list of possible hand-in targets may include femto access points that use the same pseudonoise (PN) code 676 as reported by the wireless communication device 104 in the handoff request 672. Based on the pseudonoise (PN) code 676 and other supplemental information regarding the vicinity of the wireless communication device 104, the core network 114 may determine 704 a reasonably sized list of possible hand-in targets.

The core network 114 may then request 706 uplink measurements for the wireless communication device 104 from each of the femto access points on the list of possible hand-in targets. This request may include the uplink operating frequency of the wireless communication device 104 so that each femto access point can measure the uplink pilot signal of the wireless communication device 104.

The core network 114 may receive 708 uplink measurements for the wireless communication device 104 from each of the femto access points on the list of possible hand-in targets. Based on the received uplink measurements for the wireless communication device 104, the core network 114 may estimate 710 which femto access point is the hand-in target (in this case, the femto access point 106 is the hand-in target). The core network 114 may then send 712 a handoff information message 566 to the hand-in target. The handoff information message 566 may instruct the femto access point 106 to adjust transmit power and/or switch carriers to limit interference.

The method 700 of FIG. 8 described above may be performed by various hardware and/or software component(s) and/or module(s) corresponding to the means-plus-function blocks 700A illustrated in FIG. 8A. In other words, blocks 702 through 712 illustrated in FIG. 8 correspond to means-plus-function blocks 702A through 712A illustrated in FIG. 8A.

Figure 9:
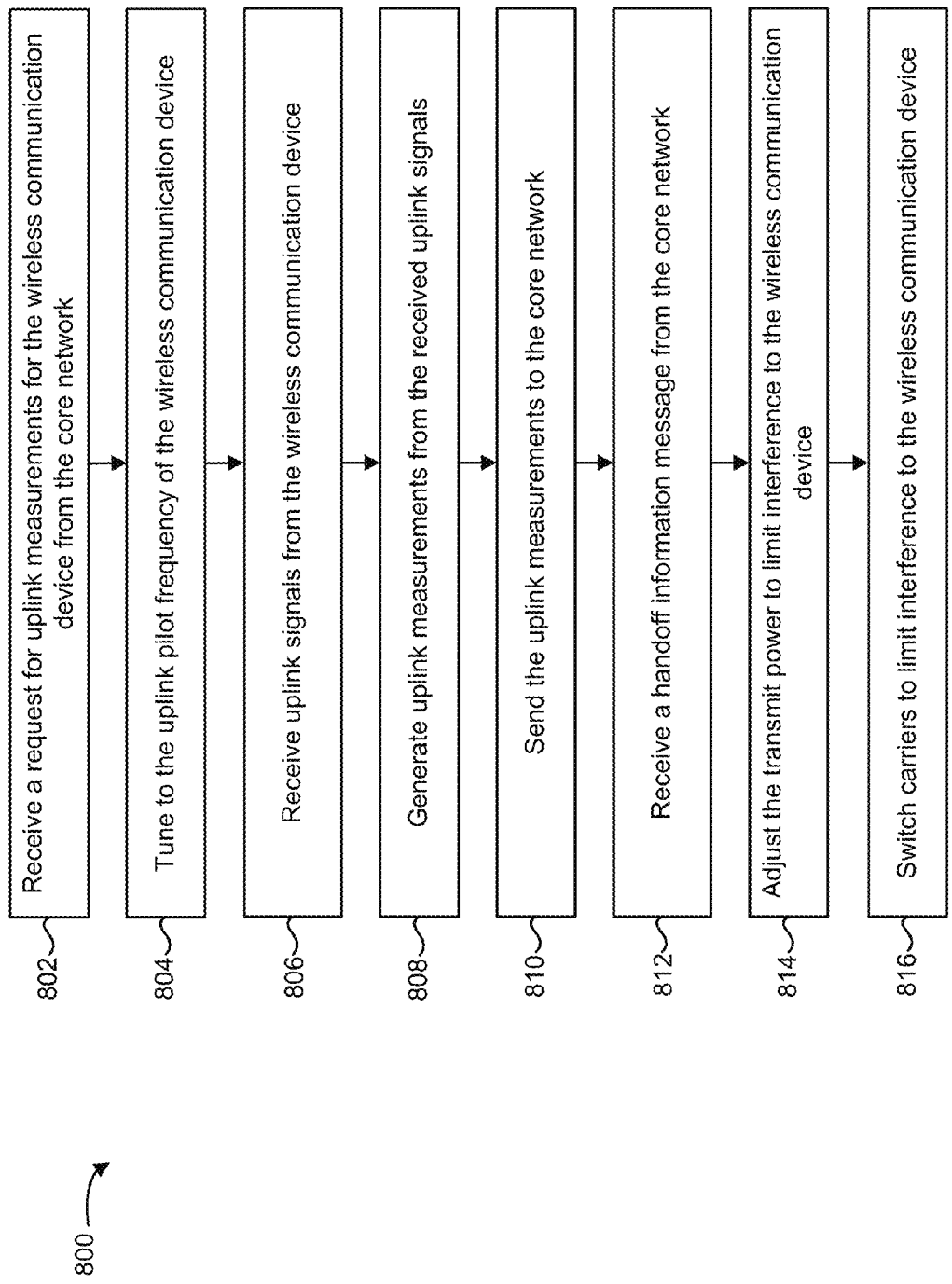
FIG. 9 is a flow diagram of another method for interference management.

FIG. 9 is a flow diagram of another method 800 for interference management. The method 800 may be performed by a femto access point 106. The femto access point 106 may be the hand-in target for a wireless communication device 104. The femto access point 106 may receive 802 a request for uplink measurements of the wireless communication device 104 from the core network 114. As discussed above, the request for uplink measurements of the wireless communication device 104 may include the uplink pilot frequency used by the wireless communication device 104. The femto access point 106 may tune 804 to the uplink pilot frequency of the wireless communication device 104.

The femto access point 106 may then receive 806 uplink signals from the wireless communication device 104. For example, the femto access point 106 may receive the uplink pilot signal 112 transmitted by the wireless communication device 104. The femto access point 106 may generate 808 uplink measurements from the received uplink signals. The femto access point 106 may then send 810 the uplink measurements to the core network 114.

Once the core network 114 has identified the femto access point 106 as the possible hand-in target, the femto access point 106 may receive 812 a handoff information message 566 from the core network 114. When the femto access point 106 receives 812 a handoff information message 566 (and has thus been determined to be the hand-in target), the femto access point 106 knows that a nearby wireless communication device 104 communicating with a macro base station 102 (or other femto access point) can hear a pilot signal or beacon signal transmitted by the femto access point 106. Given that the wireless communication device 104 is not allowed to be served by the femto access point 106 (i.e., the wireless communication device 104 is not part of the closed subscriber group (CSG) associated with the femto access point 106), the femto access point 106 is likely to create a coverage hole for the wireless communication device 104.

The handoff information message 566 may include instructions for the femto access point 106. For example, the handoff information message 566 may instruct the femto access point 106 to adjust 814 the transmit power of the femto access point 106 to limit interference to the wireless communication device 104. In one configuration, the handoff information message 566 may indicate the adjusted transmit power to be used by the femto access point 106. In another configuration, the handoff information message 566 may only indicate that a change in transmit power is needed, allowing the femto access point 106 to determine the appropriate power adjustment. As another example, the handoff information message 566 may instruct the femto access point 106 to switch 816 carriers to limit interference to the wireless communication device 104. In one configuration, the handoff information message 566 may indicate which different carrier 242 the femto access point 106 is to switch to. In another configuration, the handoff information message 566 may only indicate that a switch is necessary, allowing the femto access point 106 to select a different carrier 242.

Figure 9A:
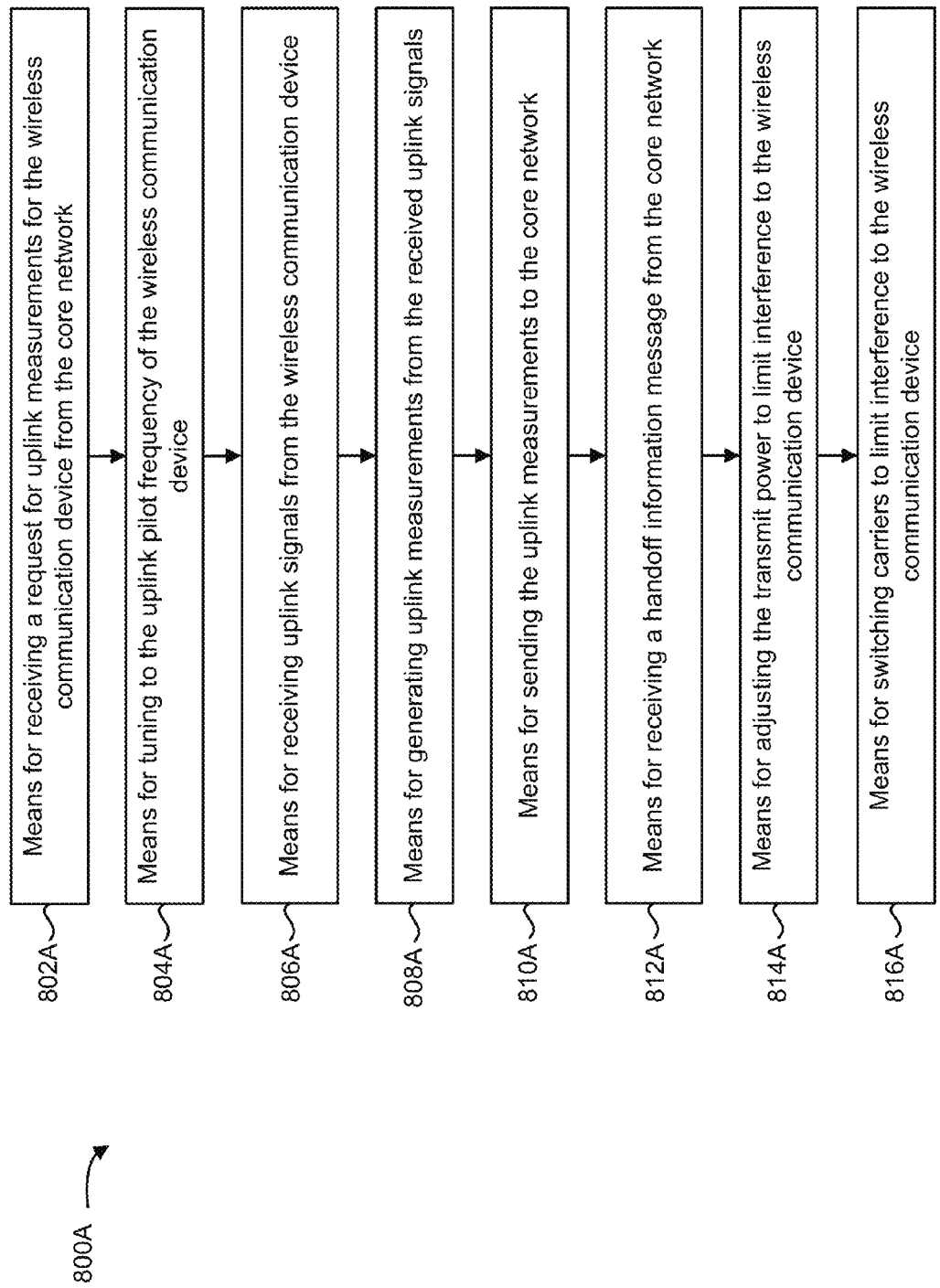
FIG. 9A illustrates means-plus-function blocks corresponding to the method of FIG. 9.

The method 800 of FIG. 9 described above may be performed by various hardware and/or software component(s) and/or module(s) corresponding to the means-plus-function blocks 800A illustrated in FIG. 9A. In other words, blocks 802 through 816 illustrated in FIG. 9 correspond to means-plus-function blocks 802A through 816A illustrated in FIG. 9A.

Figure 10:
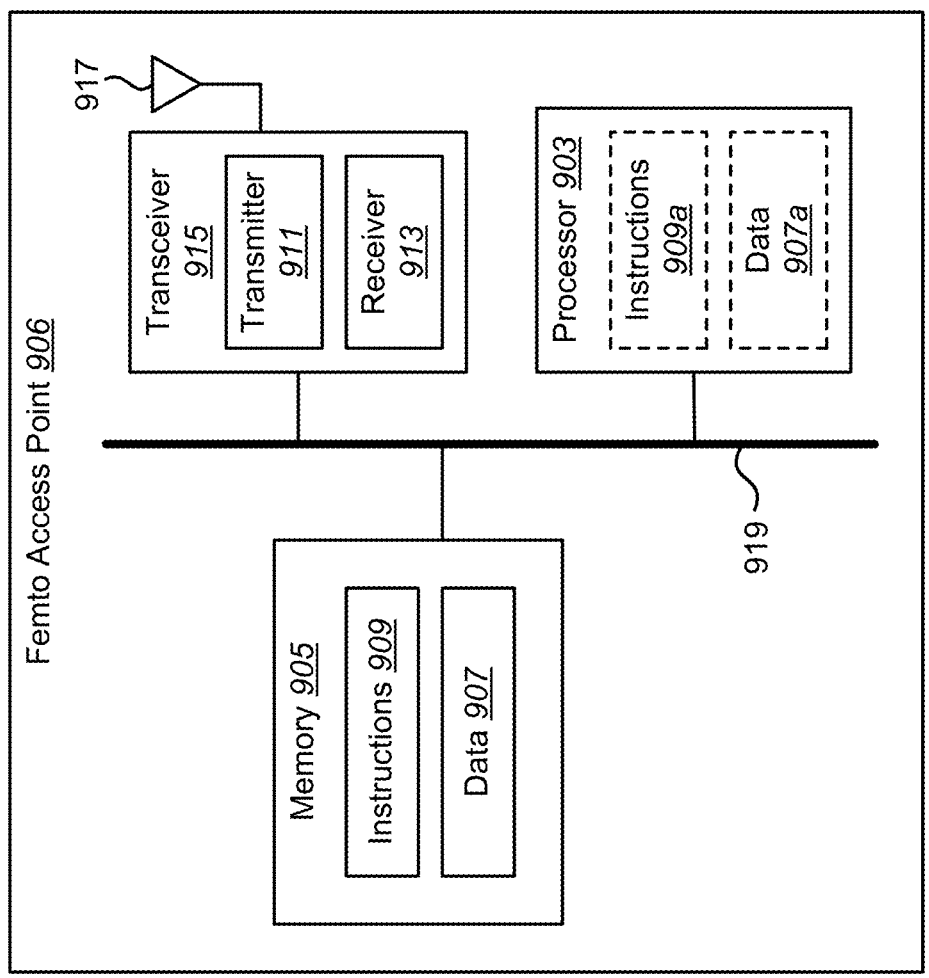
FIG. 10 illustrates certain components that may be included within a femto access point.

FIG. 10 illustrates certain components that may be included within a femto access point 906. A femto access point 906 may also be referred to as, and may include some or all of the functionality of, an access point, a broadcast transmitter, a home evolved NodeB (HeNB), a femtocell, a picocell, etc. The femto access point 906 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the femto access point 906 of FIG. 10, in an alternative configuration, a combination of processors (e.g., an ARM and DSP) could be used.

The femto access point 906 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 907 and instructions 909 may be stored in the memory 905. The instructions 909 may be executable by the processor 903 to implement the methods disclosed herein. Executing the instructions 909 may involve the use of the data 907 that is stored in the memory 905. When the processor 903 executes the instructions 909, various portions of the instructions 909a may be loaded onto the processor 903, and various pieces of data 907a may be loaded onto the processor 903.

The femto access point 906 may also include a transmitter 911 and a receiver 913 to allow transmission and reception of signals to and from the femto access point 906. The transmitter 911 and receiver 913 may be collectively referred to as a transceiver 915. An antenna 917 may be electrically coupled to the transceiver 915. The femto access point 906 may also include (not shown) multiple transmitters, multiple receivers, multiple transceivers and/or additional antennas.

The various components of the femto access point 906 may be coupled together by one or more buses, which may include a power bus, a control signal bus, a status signal bus, a data bus, etc. For the sake of clarity, the various buses are illustrated in FIG. 10 as a bus system 919.

Figure 11:
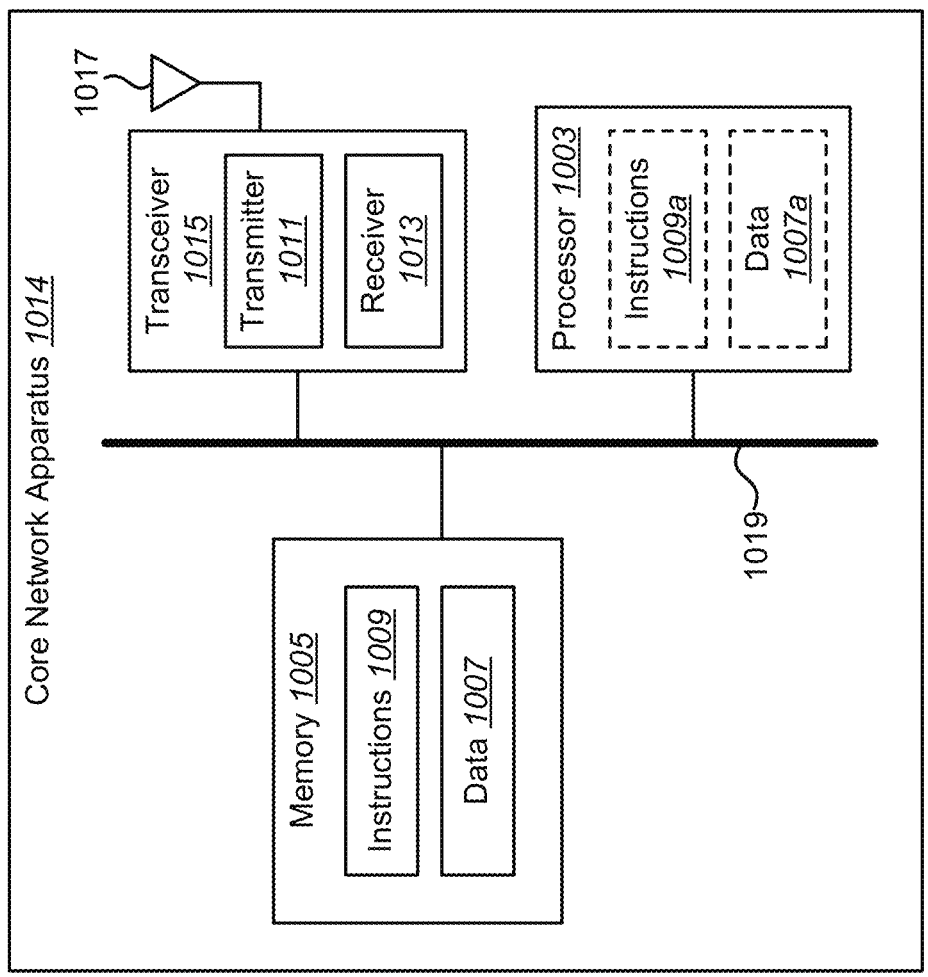
FIG. 11 illustrates certain components that may be included within a core network apparatus.

FIG. 11 illustrates certain components that may be included within a core network apparatus 1014. The core network apparatus 1014 may be a machine or machines that provide communication services to a wireless communication network 100. The core network apparatus 1014 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the core network apparatus 1014 of FIG. 11, in an alternative configuration, a combination of processors (e.g., an ARM and DSP) could be used.

The core network apparatus 1014 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1007 and instructions 1009 may be stored in the memory 1005. The instructions 1009 may be executable by the processor 1003 to implement the methods disclosed herein. Executing the instructions 1009 may involve the use of the data 1007 that is stored in the memory 1005. When the processor 1003 executes the instructions 1009, various portions of the instructions 1009a may be loaded onto the processor 1003, and various pieces of data 1007a may be loaded onto the processor 1003.

The core network apparatus 1014 may also include a transmitter 1011 and a receiver 1013 to allow transmission and reception of signals to and from the core network apparatus 1014. The transmitter 1011 and receiver 1013 may be collectively referred to as a transceiver 1015. An antenna 1017 may be electrically coupled to the transceiver 1015. The core network apparatus 1014 may also include (not shown) multiple transmitters, multiple receivers, multiple transceivers and/or additional antennas.

The various components of the core network apparatus 1014 may be coupled together by one or more buses, which may include a power bus, a control signal bus, a status signal bus, a data bus, etc. For the sake of clarity, the various buses are illustrated in FIG. 11 as a bus system 1019.

Figure 12:
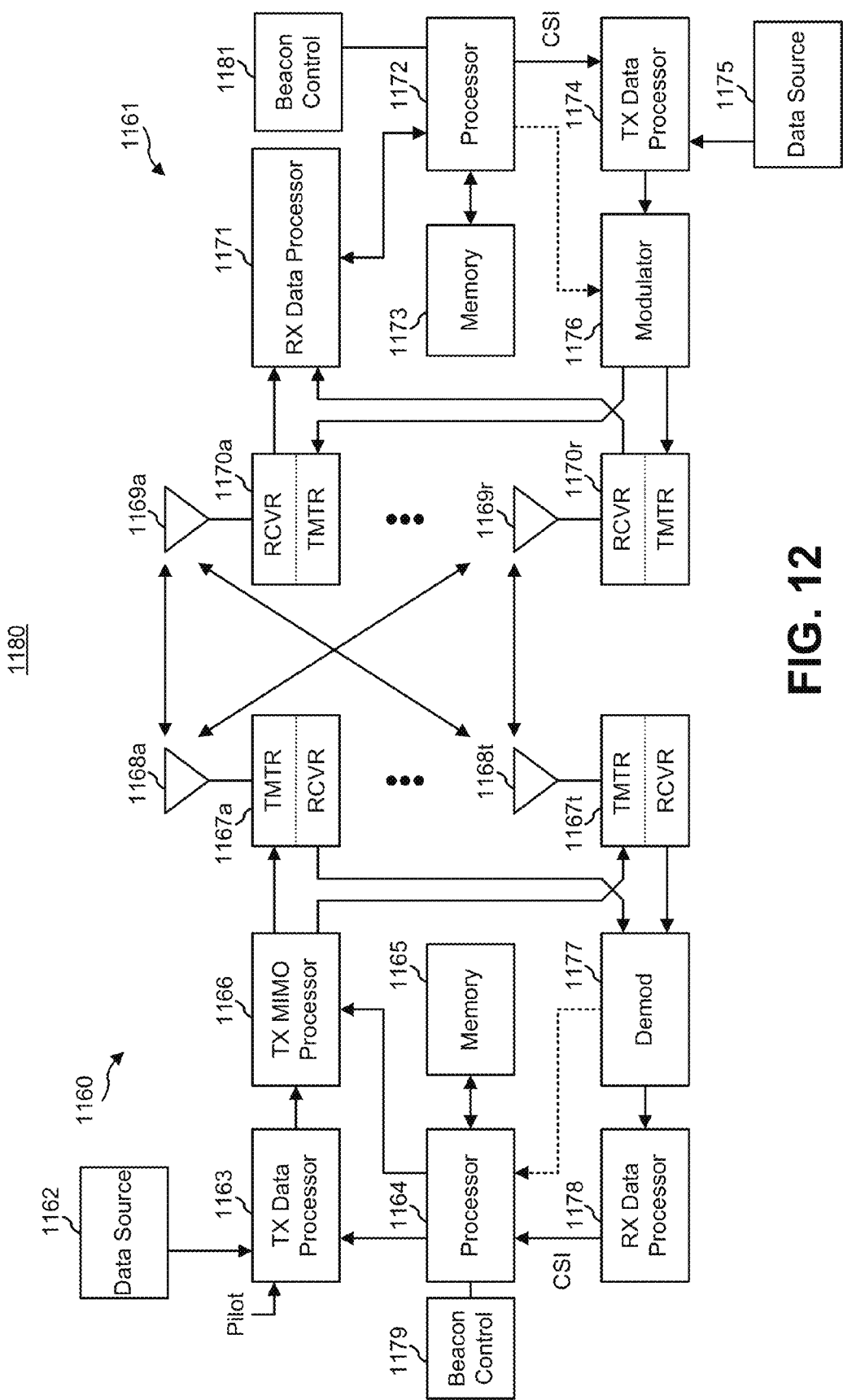
FIG. 12 illustrates two wireless devices in a multiple-in and multiple-out (MIMO) system.

FIG. 12 illustrates two wireless devices in a multiple-in and multiple-out (MIMO) system 1180. A first wireless device 1160 may be a base station and a second wireless device may be a wireless communication device. At the first wireless device 1160, traffic data for a number of data streams is provided from a data source 1162 to a transmit (TX) data processor 1163. Each data stream may then be transmitted over a respective transmit antenna.

The TX data processor 1163 formats, codes and interleaves the traffic data for each data stream based on a particular coding scheme selected for that data stream to provide coded data. The coded data for each data stream may be multiplexed with pilot data using OFDM or other suitable techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by a processor 1164. A data memory 1165 may store program code, data and other information used by the processor 1164 or other components of the first wireless device 1160.

The modulation symbols for all data streams are then provided to a TX MIMO processor 1166, which may further process the modulation symbols (e.g., for OFDM). The TX MIMO processor 1166 then provides NT modulation symbol streams to NT transceivers 1167a through 1167t. In some aspects, the TX MIMO processor 1166 applies beam-forming weights to the symbols of the data streams and to the antenna from which the symbol is being transmitted.

Each transceiver 1167 receives and processes a respective symbol stream to provide one or more analog signals, and further conditions (e.g., amplifies, filters, and upconverts) the analog signals to provide a modulated signal suitable for transmission over the MIMO channel. NT modulated signals from transceivers 1167a through 1167t are then transmitted from NT antennas 1168a through 1168t, respectively.

At the second wireless device 1161, the transmitted modulated signals are received by NR antennas 1169a-r and the received signal from each antenna 1169 is provided to a respective transceiver (XCVR) 1170a-r. Each transceiver 1170 conditions (e.g., filters, amplifies, and downconverts) a respective received signal, digitizes the conditioned signal to provide samples and further processes the samples to provide a corresponding "received" symbol stream.

A receive (RX) data processor 1171 then receives and processes the NR received symbol streams from NR transceivers 1170 based on a particular receiver processing technique to provide NT "detected" symbol streams. The RX data processor 1171 then demodulates, de-interleaves and decodes each detected symbol stream to recover the traffic data for the data stream. The processing by the RX data processor 1171 is complementary to that performed by the TX MIMO processor 1166 and the TX data processor 1163 at the first wireless device 1160.

A processor 1172 periodically determines which pre-coding matrix to use (discussed below). The processor 1172 formulates a reverse link message comprising a matrix index portion and a rank value portion. A data memory 1173 may store program code, data and other information used by the processor 1172 or other components of the second wireless device 1161. The reverse link message may comprise various types of information regarding the communication link and/or the received data stream. The reverse link message is then processed by a TX data processor 1174, which also receives traffic data for a number of data streams from a data source 1175, modulated by a modulator 1176, conditioned by the transceivers 1170*a-r* and transmitted back to the first wireless device 1160.

At the first wireless device 1160, the modulated signals from the second wireless device 1161 are received by the antennas 1166, conditioned by the transceivers 1167, demodulated by a demodulator (DEMOD) 1177 and processed by a RX data processor 1178 to extract the reverse link message transmitted by the second wireless device 1161. The processor 1164 then determines which pre-coding matrix to use for determining the beam-forming weights and then processes the extracted message.

FIG. 12 also illustrates that the communication components may include one or more components that perform beacon-related operations. For example, a beacon control component 1179 may cooperate with the processor 1164 and/or other components of the first wireless device 1160 to send beacon signals to another device (e.g., the second wireless device 1161) and to receive beacon signals from another device (e.g., another base station) as taught herein. Similarly, a beacon control component 1181 may cooperate with the processor 1172 and/or other components of the second wireless device 1161 to receive beacon signals from another device (e.g., the first wireless device 1160). It should be appreciated that for each wireless device 1160, 1161, the functionality of two or more of the described components may be provided by a single component. For example, a single processing component may provide the functionality of the beacon control component 1179 and the processor 1164 and a single processing component may provide the functionality of the beacon control component 1181 and the processor 1172.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, femto access point, and so on.

Figure 13:
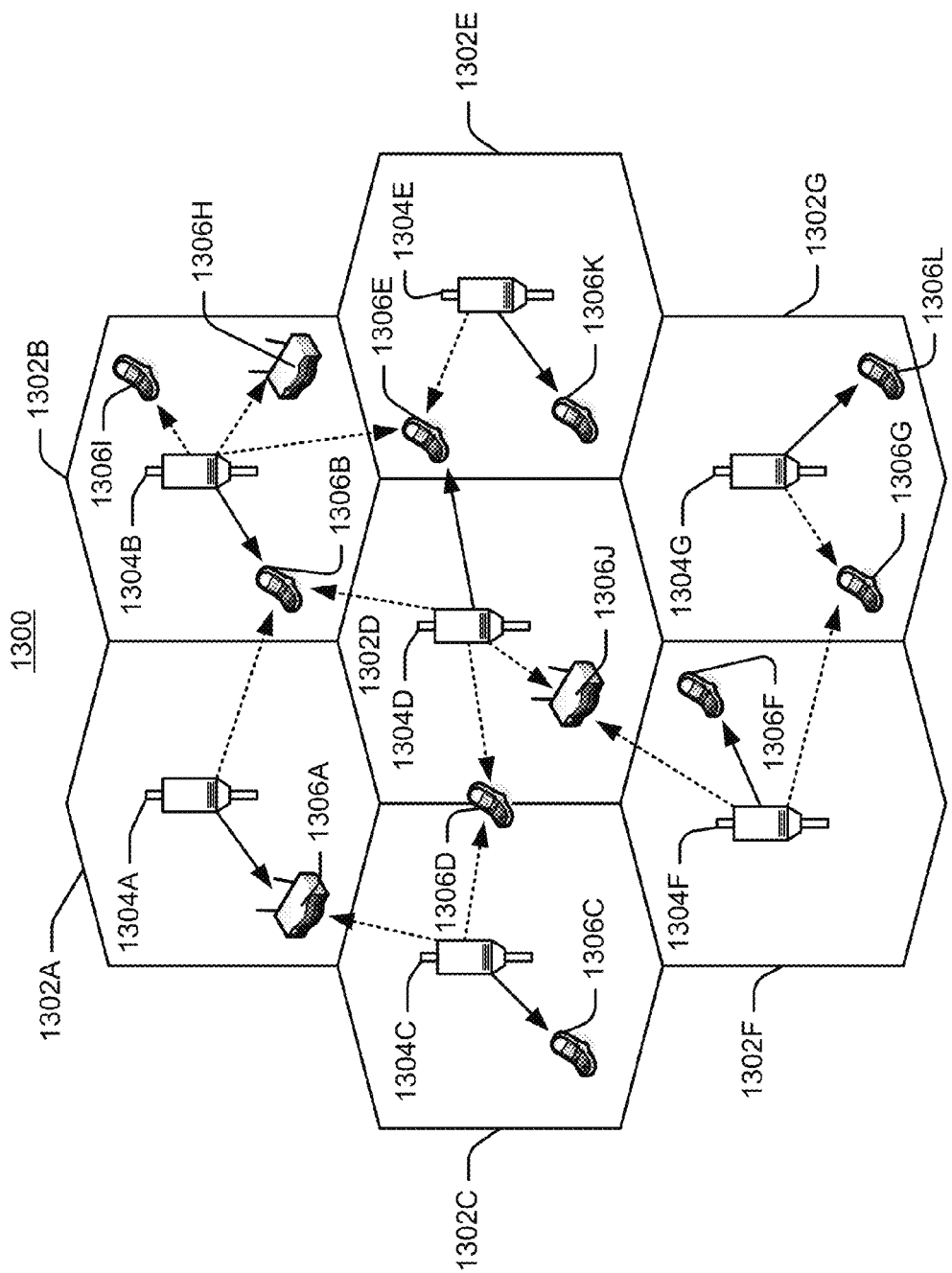
FIG. 13 illustrates a wireless communication system, configured to support a number of users, in which the teachings herein may be implemented.

FIG. 13 illustrates a wireless communication system 1300, configured to support a number of users, in which the teachings herein may be implemented. The system 1300 provides communication for multiple cells 1302, such as, for example, macro cells 1302A-1302G, with each cell being serviced by a corresponding access node 1304 (e.g., access nodes 1304A-1304G). As shown in FIG. 13, access terminals 1306 (e.g., access terminals 1306A-1306L) may be dispersed at various locations throughout the system over time. Each access terminal 1306 may communicate with one or more access nodes 1304 on a forward link ("FL") and/or a reverse link ("RL") at a given moment, depending upon whether the access terminal 1306 is active and whether it is in soft handoff, for example. The wireless communication system 1300 may provide service over a large geographic region. For example, macro cells 1302A-1302G may cover a few blocks in a neighborhood.

Figure 14:
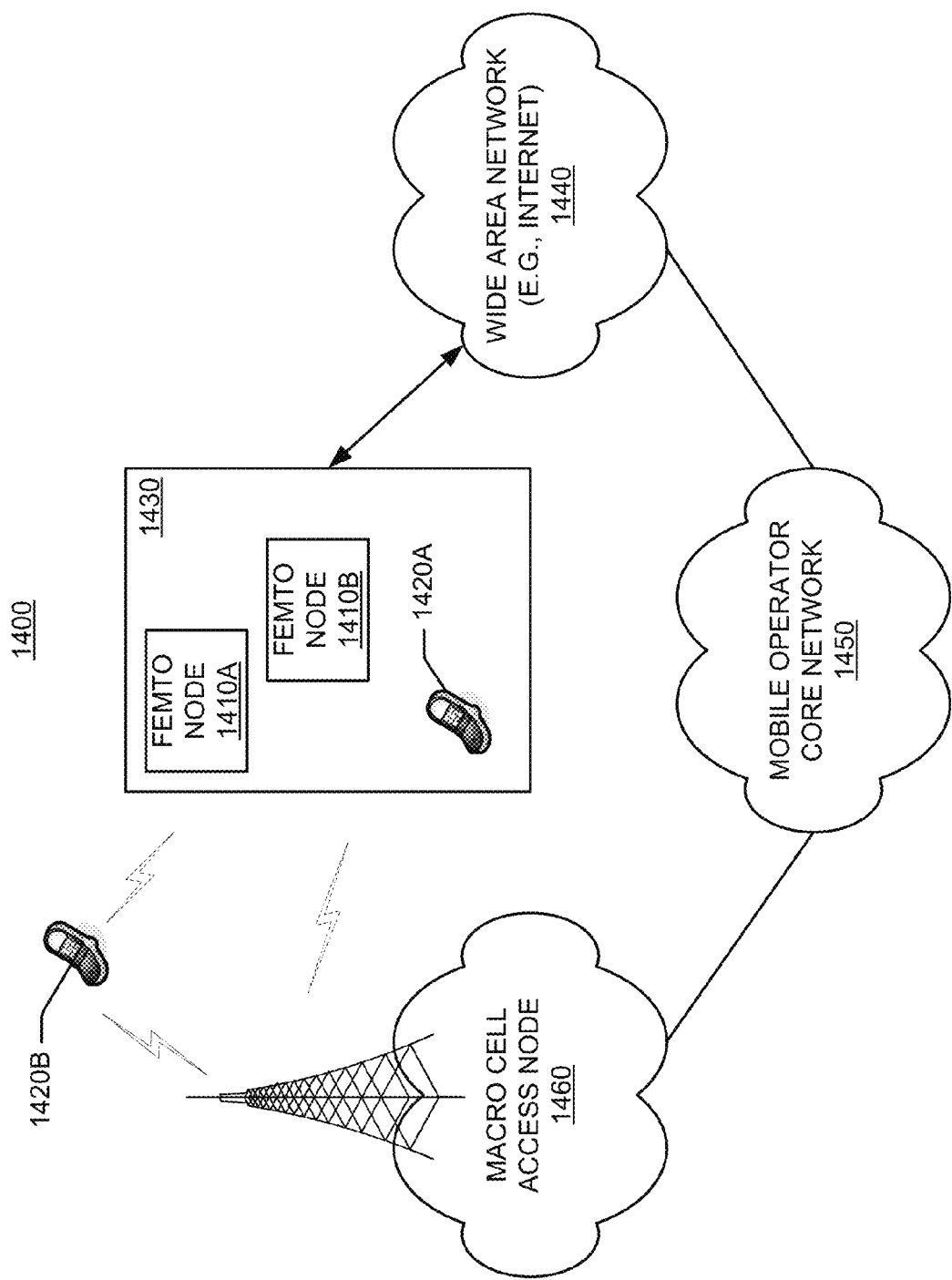
FIG. 14 illustrates an exemplary communication system where one or more femto nodes are deployed within a network environment.

FIG. 14 illustrates an exemplary communication system 1400 where one or more femto nodes are deployed within a network environment. Specifically, the system 1400 includes multiple femto nodes 1410 (e.g., femto nodes 1410A and 1410B) installed in a relatively small scale network environment (e.g., in one or more user residences 1430). Each femto node 1410 may be coupled to a wide area network 1440 (e.g., the Internet) and a mobile operator core network 1450 via a DSL router, a cable modem, a wireless link, or other connectivity means (not shown). As will be discussed below, each femto node 1410 may be configured to serve associated access terminals 1420 (e.g., access terminal 1420A) and, optionally, alien access terminals 1420 (e.g., access terminal 1420B). In other words, access to femto nodes 1410 may be restricted whereby a given access terminal 1420 may be served by a set of designated (e.g., home) femto node(s) 1410 but may not be served by any non-designated femto nodes 1410 (e.g., a neighbor's femto node 1410).

Figure 15:
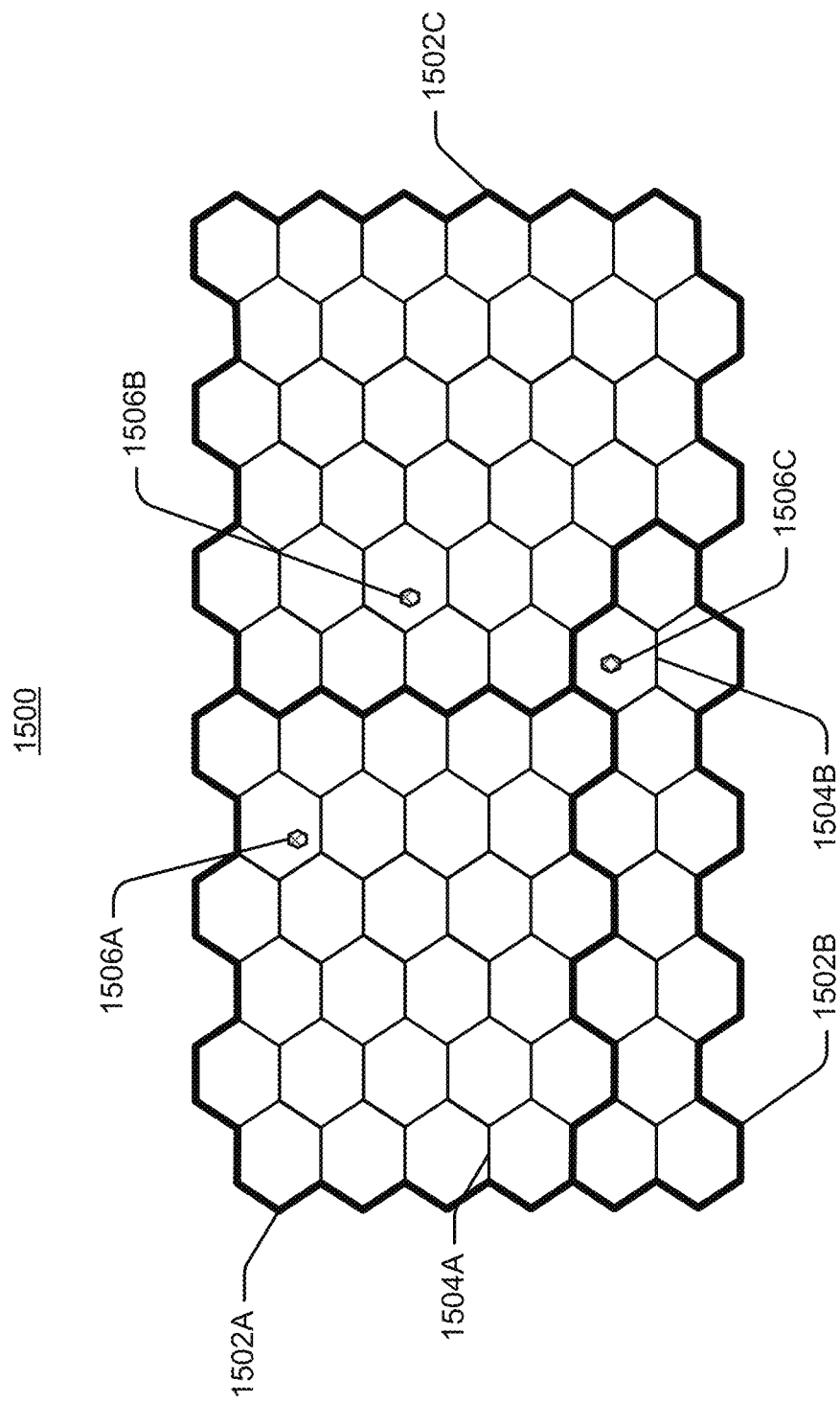
FIG. 15 illustrates an example of a coverage map where several tracking areas (or routing areas or location areas) are defined.

FIG. 15 illustrates an example of a coverage map 1500 where several tracking areas 1502 (or routing areas or location areas) are defined, each of which includes several macro coverage areas 1504. Here, areas of coverage associated with tracking areas 1502A, 1502B, and 1502C are delineated by the wide lines and the macro coverage areas 1504 are represented by the hexagons. The tracking areas 1502 also include femto coverage areas 1506. In this example, each of the femto coverage areas 1506 (e.g., femto coverage area 1506C) is depicted within a macro coverage area 1504 (e.g., macro coverage area 1504B). It should be appreciated, however, that a femto coverage area 1506 may not lie entirely within a macro coverage area 1504. In practice, a large number of femto coverage areas 1506 may be defined with a given tracking area 1502 or macro coverage area 1504. Also, one or more pico coverage areas (not shown) may be defined within a given tracking area 1502 or macro coverage area 1504.

Referring again to FIG. 14, the owner of a femto node 1410 may subscribe to mobile service, such as, for example, 3G mobile service, offered through the mobile operator core network 1450. In addition, an access terminal 1420 may be capable of operating both in macro environments and in smaller scale (e.g., residential) network environments. In other words, depending on the current location of the access terminal 1420, the access terminal 1420 may be served by an access node 1460 of the macro cell mobile network 1450 or by any one of a set of femto nodes 1410 (e.g., the femto nodes 1410A and 1410B that reside within a corresponding user residence 1430). For example, when a subscriber is outside his home, he is served by a standard macro access node (e.g., node 1460) and when the subscriber is at home, he is served by a femto node (e.g., node 1410A). Here, it should be appreciated that a femto node 1420 may be backward compatible with existing access terminals 1420.

A femto node 1410 may be deployed on a single frequency or, in the alternative, on multiple frequencies. Depending on the particular configuration, the single frequency or one or more of the multiple frequencies may overlap with one or more frequencies used by a macro node (e.g., node 1460).

In some aspects, an access terminal 1420 may be configured to connect to a preferred femto node (e.g., the home femto node of the access terminal 1420) whenever such connectivity is possible. For example, whenever the access terminal 1420 is within the user's residence 1430, it may be desired that the access terminal 1420 communicate only with the home femto node 1410.

In some aspects, if the access terminal 1420 operates within the macro cellular network 1450 but is not residing on its most preferred network (e.g., as defined in a preferred roaming list), the access terminal 1420 may continue to search for the most preferred network (e.g., the preferred femto node 1410) using a Better System Reselection ("BSR"), which may involve a periodic scanning of available systems to determine whether better systems are currently available, and subsequent efforts to associate with such preferred systems. With the acquisition entry, the access terminal 1420 may limit the search for specific band and channel. For example, the search for the most preferred system may be repeated periodically. Upon discovery of a preferred femto node 1410, the access terminal 1420 selects the femto node 1410 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1410 that reside within the corresponding user residence 1430). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc.

Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3-4 and 7-9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for reducing interference to wireless communication devices, comprising:
    determining that a base station is deployed with a first coverage area that overlaps a second coverage area of a femto access point, wherein the base station uses a first carrier for wireless communications, wherein the femto access point uses a second carrier for wireless communications, and wherein transmissions by the femto access point interfere with transmissions by the base station;
    receiving a hand-off request from a wireless communication device indicating a hand-off attempt to the femto access point;
    estimating an amount of radio frequency (RF) leakage experienced by wireless communication devices communicating with the base station; and
    minimizing interference experienced by the wireless communication devices based at least in part on the estimated RF leakage, in response to receiving the hand-off request, by switching the femto access point to communicating using a third carrier.

2. The method of claim 1, wherein the method is performed by the femto access point.

3. The method of claim 1, wherein the method is performed by a core network apparatus.

4. The method of claim 1, wherein the base station is a femto access point.

5. The method of claim 1, wherein the base station is a macro base station.

6. The method of claim 1, wherein determining that the base station is deployed comprises monitoring a downlink signal strength on the first carrier.

7. The method of claim 1, further comprising determining a third carrier different from the first carrier and the second carrier.

8. The method of claim 7, wherein the third carrier has fewer base station and femto access point deployments than the second carrier.

9. The method of claim 7, wherein the third carrier has no base station or femto access point deployments.

10. The method of claim 1, wherein the first carrier and the second carrier are the same carrier.

11. The method of claim 1, wherein the first carrier and the second carrier are adjacent.

12. The method of claim 7, wherein the method is performed by a core network, and wherein switching the femto access point to communicating using the third carrier comprises sending the third carrier to the femto access point.

13. The method of claim 1, wherein estimating the amount of RF leakage is performed using a current transmit power of the femto access point, the second carrier used by the femto access point, the first carrier used by the base station and an adjacent channel interference ratio (ACIR).

14. A wireless device configured for reducing interference to wireless communication devices, comprising:
    a processor;
    memory in electronic communication with the processor;
    instructions stored in the memory, the instructions being executable by the processor to:
        determine that a base station is deployed with a first coverage area that overlaps a second coverage area of a femto access point, wherein the base station uses a first carrier for wireless communications, wherein the femto access point uses a second carrier for wireless communications, and wherein transmissions by the femto access point interfere with transmissions by the base station;
        receive a hand-off request from a wireless communication device indicating a hand-off attempt to the femto access point;
        estimate an amount of radio frequency (RF) leakage experienced by wireless communication devices communicating with the base station; and
        minimize interference experienced by the wireless communication devices based at least in part on the estimated RF leakage, in response to receiving the handoff request, by switching the femto access point to communicating using a third carrier.

15. The wireless device of claim 14, wherein the wireless device is the femto access point.

16. The wireless device of claim 14, wherein the wireless device is a core network apparatus.

17. The wireless device of claim 14, wherein the base station is a femto access point.

18. The wireless device of claim 14, wherein the base station is a macro base station.

19. The wireless device of claim 14, wherein determining that the base station is deployed comprises monitoring a downlink signal strength on the first carrier.

20. The wireless device of claim 14, wherein the instructions are further executable to determine a third carrier different from the first carrier and the second carrier.

21. The wireless device of claim 20, wherein the third carrier has fewer base station and femto access point deployments than the second carrier.

22. The wireless device of claim 20, wherein the third carrier has no base station or femto access point deployments.

23. The wireless device of claim 14, wherein the first carrier and the second carrier are the same carrier.

24. The wireless device of claim 14, wherein the first carrier and the second carrier are adjacent.

25. The wireless device of claim 20, wherein the wireless device is a core network apparatus, and wherein switching the femto access point to communicating using the third carrier comprises sending the third carrier to the femto access point.

26. The wireless device of claim 14, wherein estimating the amount of RF leakage is performed using a current transmit power of the femto access point, the second carrier used by the femto access point, the first carrier used by the base station and an adjacent channel interference ratio (ACIR).

27. A wireless device configured for reducing interference to wireless communication devices, comprising:
   means for determining that a base station is deployed with a first coverage area that overlaps a second coverage area of a femto access point, wherein the base station uses a first carrier for wireless communications, wherein the femto access point uses a second carrier for wireless communications, and wherein transmissions by the femto access point interfere with transmissions by the base station;
   means for receiving a hand-off request from a wireless communication device indicating a hand-off attempt to the femto access point;
   means for estimating an amount of radio frequency (RF) leakage experienced by wireless communication devices communicating with the base station; and
   means for minimizing interference experienced by the wireless communication devices based at least in part on the estimated RF leakage, in response to receiving the hand-off request, by switching the femto access point to communicating using a third carrier.

28. A computer-program product for reducing interference to wireless communication devices, the computer-program product comprising a computer-readable medium having instructions thereon, the instructions comprising:
   code for causing at least one computer to determine that a base station is deployed with a first coverage area that overlaps a second coverage area of a femto access point, wherein the base station uses a first carrier for wireless communications, wherein the femto access point uses a second carrier for wireless communications, and wherein transmissions by the femto access point interfere with transmissions by the base station;
   code for receiving a hand-off request from a wireless communication device indicating a hand-off attempt to the femto access point;
   code for causing at least one computer to estimate an amount of radio frequency (RF) leakage experienced by wireless communication devices communicating with the base station; and
   code for causing at least one computer to minimize interference experienced by the wireless communication devices based at least in part on the estimated RF leakage, in response to receiving the hand-off request, by switching the femto access point to communicating using a third carrier.

29. The method of claim 1, wherein the femto access point is configured to provide coverage over an area smaller than a picocell.

* * * * *